US012647020B2

(12) United States Patent
Gose

(10) Patent No.: US 12,647,020 B2
(45) Date of Patent: Jun. 2, 2026

(54) SYSTEMS AND METHODS FOR SENSING TEMPERATURE OF INVERTER FOR ELECTRIC VEHICLE

(71) Applicant: BorgWarner US Technologies LLC, Wilmington, DE (US)

(72) Inventor: Mark Wendell Gose, Kokomo, IN (US)

(73) Assignee: BorgWarner US Technologies LLC, Wilmington, DE (US)

( * ) Notice: Subject to any disclaimer, the term of this patent is extended or adjusted under 35 U.S.C. 154(b) by 540 days.

(21) Appl. No.: 18/153,810

(22) Filed: Jan. 12, 2023

(65) Prior Publication Data

US 2024/0106381 A1     Mar. 28, 2024

Related U.S. Application Data

(60) Provisional application No. 63/378,601, filed on Oct. 6, 2022, provisional application No. 63/377,501, filed
(Continued)

(51) Int. Cl.
H02M 1/32          (2007.01)
H02M 1/44          (2007.01)
(Continued)

(52) U.S. Cl.
CPC ............. H02M 1/327 (2021.05); H02M 1/44 (2013.01); H02M 7/003 (2013.01); H02M 7/5387 (2013.01)

(58) Field of Classification Search
CPC ........ H02M 1/327; H02M 1/44; H02M 7/003; H02M 7/5387
See application file for complete search history.

(56) References Cited

U.S. PATENT DOCUMENTS

| 4,054,828 A | 10/1977 | Conzelmann et al. |
| 4,128,801 A | 12/1978 | Gansert et al. |
| | (Continued) | |

FOREIGN PATENT DOCUMENTS

| WO | 2007093598 A1 | 8/2007 |
| WO | 2013054413 A1 | 4/2013 |
| | (Continued) | |

OTHER PUBLICATIONS

Balogh, L., "Fundamentals of MOSFET and IGBT Gate Driver Circuits," Texas Instruments Application Report, SLUA618-March (2017), Retrieved from internet URL: https://ghioni.faculty.polimi.it/pel/readmat/gate-drive.pdf, 65 pages.
(Continued)

*Primary Examiner* — Lakaisha Jackson
(74) *Attorney, Agent, or Firm* — Bookoff McAndrews, PLLC; Joshua M. Haines

(57)          ABSTRACT

A system comprises: an inverter configured to convert DC power from a battery to AC power to drive a motor, wherein the inverter includes: a power module including a drain terminal and a source terminal; one or more phase switches configured to control a current flow between the drain terminal and the source terminal; and a point-of-use controller including two or more thermal sensors on the point-of-use controller, the point-of-use controller configured to determine a temperature of the one or more phase switches using the two or more thermal sensors.

17 Claims, 10 Drawing Sheets

Related U.S. Application Data on Sep. 28, 2022, provisional application No. 63/377,512, filed on Sep. 28, 2022, provisional application No. 63/377,486, filed on Sep. 28, 2022.

(51) Int. Cl.
H02M 7/00 (2006.01)
H02M 7/5387 (2007.01)

(56) References Cited

U.S. PATENT DOCUMENTS

| | | | |
|---|---|---|---|
| 4,564,771 A | 1/1986 | Flohrs | |
| 4,618,875 A | 10/1986 | Flohrs | |
| 4,716,304 A | 12/1987 | Fiebig et al. | |
| 5,068,703 A | 11/1991 | Conzelmann et al. | |
| 5,432,371 A | 7/1995 | Denner et al. | |
| 5,559,661 A | 9/1996 | Meinders | |
| 5,654,863 A | 8/1997 | Davies | |
| 5,764,007 A | 6/1998 | Jones | |
| 5,841,312 A | 11/1998 | Mindl et al. | |
| 6,028,470 A | 2/2000 | Michel et al. | |
| 6,163,138 A | 12/2000 | Kohl et al. | |
| 6,351,173 B1 | 2/2002 | Ovens et al. | |
| 6,426,857 B1 | 7/2002 | Doster et al. | |
| 6,597,556 B1 | 7/2003 | Michel et al. | |
| 6,812,553 B2 | 11/2004 | Gerbsch et al. | |
| 6,943,293 B1 | 9/2005 | Jeter et al. | |
| 7,095,098 B2 | 8/2006 | Gerbsch et al. | |
| 7,229,855 B2 | 6/2007 | Murphy | |
| 7,295,433 B2 | 11/2007 | Taylor et al. | |
| 7,459,954 B2 | 12/2008 | Kuehner et al. | |
| 7,538,425 B2 | 5/2009 | Myers et al. | |
| 7,551,439 B2 | 6/2009 | Peugh et al. | |
| 7,616,047 B2 | 11/2009 | Rees et al. | |
| 7,724,046 B2 | 5/2010 | Wendt et al. | |
| 7,750,720 B2 | 7/2010 | Dittrich | |
| 9,088,159 B2 | 7/2015 | Peuser | |
| 9,275,915 B2 | 3/2016 | Heinisch et al. | |
| 9,373,970 B2 | 6/2016 | Feuerstack et al. | |
| 9,431,932 B2 | 8/2016 | Schmidt et al. | |
| 9,515,584 B2 | 12/2016 | Koller et al. | |
| 9,548,675 B2 | 1/2017 | Schoenknecht | |
| 9,806,607 B2 | 10/2017 | Ranmuthu et al. | |
| 9,843,320 B2 | 12/2017 | Richter et al. | |
| 9,871,444 B2 | 1/2018 | Ni et al. | |
| 9,882,490 B2 | 1/2018 | Veeramreddi et al. | |
| 10,111,285 B2 | 10/2018 | Shi et al. | |
| 10,116,300 B2 | 10/2018 | Blasco et al. | |
| 10,232,718 B2 | 3/2019 | Trunk et al. | |
| 10,270,354 B1 | 4/2019 | Lu et al. | |
| 10,291,225 B2 | 5/2019 | Li et al. | |
| 10,525,847 B2 | 1/2020 | Strobel et al. | |
| 10,673,432 B1 * | 6/2020 | Kaya | H02M 3/158 |
| 10,742,205 B1 * | 8/2020 | White | H03K 17/08 |
| 10,797,579 B2 | 10/2020 | Hashim et al. | |
| 10,924,001 B2 | 2/2021 | Li et al. | |
| 11,082,052 B2 | 8/2021 | Jang et al. | |
| 11,108,389 B2 | 8/2021 | Li et al. | |
| 11,342,911 B2 | 5/2022 | Lee et al. | |
| 11,838,011 B2 | 12/2023 | Li et al. | |
| 11,843,320 B2 | 12/2023 | Sivakumar et al. | |
| 11,848,426 B2 | 12/2023 | Zhang et al. | |
| 11,851,038 B2 | 12/2023 | Solanki et al. | |
| 11,855,522 B2 | 12/2023 | Rudolph et al. | |
| 11,855,630 B2 | 12/2023 | Dake et al. | |
| 11,870,338 B1 | 1/2024 | Narayanasamy | |
| 11,872,997 B2 | 1/2024 | Hoos et al. | |
| 11,881,859 B2 | 1/2024 | Gupta et al. | |
| 11,888,391 B2 | 1/2024 | Balasubramanian et al. | |
| 11,888,393 B2 | 1/2024 | Venkateswaran et al. | |
| 11,901,803 B2 | 2/2024 | Ruck et al. | |
| 11,901,881 B1 | 2/2024 | Narayanasamy | |
| 11,909,319 B2 | 2/2024 | Esteghlal et al. | |
| 11,916,426 B2 | 2/2024 | Oner et al. | |
| 11,923,762 B2 | 3/2024 | Sethumadhavan et al. | |
| 11,923,764 B1 | 3/2024 | Zhang | |
| 11,923,799 B2 | 3/2024 | Ojha et al. | |
| 11,925,119 B2 | 3/2024 | Male et al. | |
| 11,927,624 B2 | 3/2024 | Patel et al. | |
| 11,938,838 B2 | 3/2024 | Simonis et al. | |
| 11,942,927 B2 | 3/2024 | Purcarea et al. | |
| 11,942,934 B2 | 3/2024 | Ritter | |
| 11,945,331 B2 | 4/2024 | Blemberg et al. | |
| 11,945,522 B2 | 4/2024 | Matsumura et al. | |
| 11,949,320 B2 | 4/2024 | Jaladanki et al. | |
| 11,949,333 B2 | 4/2024 | Pahkala et al. | |
| 11,955,896 B2 | 4/2024 | Liu et al. | |
| 11,955,953 B2 | 4/2024 | Sinn et al. | |
| 11,955,964 B2 | 4/2024 | Agarwal et al. | |
| 11,962,234 B2 | 4/2024 | Narayanasamy et al. | |
| 11,962,291 B2 | 4/2024 | Oberdieck et al. | |
| 11,964,587 B2 | 4/2024 | Yukawa | |
| 11,970,076 B2 | 4/2024 | Sarfert et al. | |
| 11,977,404 B2 | 5/2024 | Chandrasekaran | |
| 11,984,802 B2 | 5/2024 | Merkin et al. | |
| 11,984,876 B2 | 5/2024 | Neidorff et al. | |
| 11,990,776 B2 | 5/2024 | Dulle | |
| 11,990,777 B2 | 5/2024 | Woll et al. | |
| 11,996,686 B2 | 5/2024 | Chan et al. | |
| 11,996,699 B2 | 5/2024 | Vasconcelos Araujo et al. | |
| 11,996,714 B2 | 5/2024 | El Markhi et al. | |
| 11,996,715 B2 | 5/2024 | Nandi et al. | |
| 11,996,762 B2 | 5/2024 | Hembach et al. | |
| 11,996,830 B2 | 5/2024 | Murthy et al. | |
| 11,996,847 B1 | 5/2024 | Kazama et al. | |
| 12,003,191 B2 | 6/2024 | Chaudhary et al. | |
| 12,003,229 B2 | 6/2024 | Kaya et al. | |
| 12,003,237 B2 | 6/2024 | Waters | |
| 12,008,847 B2 | 6/2024 | Braun et al. | |
| 12,009,679 B2 | 6/2024 | Gottwald et al. | |
| 12,012,057 B2 | 6/2024 | Schneider et al. | |
| 12,015,342 B2 | 6/2024 | Kienzler et al. | |
| 12,019,112 B2 | 6/2024 | Jarmolowitz et al. | |
| 12,021,517 B2 | 6/2024 | S et al. | |
| 2012/0219033 A1 * | 8/2012 | Tanimura | G01K 7/01 |
| | | | 374/1 |
| 2017/0331469 A1 | 11/2017 | Kilb et al. | |
| 2018/0167013 A1 | 6/2018 | Xu et al. | |
| 2019/0250046 A1 * | 8/2019 | Sun | G01R 31/2619 |
| 2020/0195121 A1 | 6/2020 | Keskar et al. | |
| 2021/0005711 A1 | 1/2021 | Martinez-Limia et al. | |
| 2022/0052610 A1 | 2/2022 | Plum | |
| 2022/0200512 A1 * | 6/2022 | Anderson | B60L 50/51 |
| 2022/0294441 A1 | 9/2022 | Purcarea et al. | |
| 2022/0337239 A1 * | 10/2022 | Kinoshita | H03K 17/18 |
| 2022/0368216 A1 * | 11/2022 | Miyake | H02M 7/53871 |
| 2023/0010616 A1 | 1/2023 | Gschwantner et al. | |
| 2023/0061922 A1 | 3/2023 | Ritter | |
| 2023/0082076 A1 | 3/2023 | Strache et al. | |
| 2023/0126070 A1 | 4/2023 | Oberdieck et al. | |
| 2023/0179198 A1 | 6/2023 | Winkler | |
| 2023/0231210 A1 | 7/2023 | Joos et al. | |
| 2023/0231400 A1 | 7/2023 | Oberdieck et al. | |
| 2023/0231496 A1 | 7/2023 | Syed et al. | |
| 2023/0238808 A1 | 7/2023 | Swoboda et al. | |
| 2023/0268826 A1 | 8/2023 | Yan et al. | |
| 2023/0298957 A1 * | 9/2023 | Furukawa | H01L 23/49537 |
| | | | 361/91.3 |
| 2023/0308026 A1 * | 9/2023 | Byers | H02M 1/08 |
| 2023/0335509 A1 | 10/2023 | Poddar | |
| 2023/0365086 A1 | 11/2023 | Schumacher et al. | |
| 2023/0370062 A1 | 11/2023 | Wolf | |
| 2023/0378022 A1 | 11/2023 | Kim et al. | |
| 2023/0386963 A1 | 11/2023 | Kim et al. | |
| 2023/0402930 A1 | 12/2023 | Corry et al. | |
| 2023/0420968 A1 | 12/2023 | Oner et al. | |
| 2023/0421049 A1 | 12/2023 | Neidorff | |
| 2024/0006869 A1 | 1/2024 | Kim et al. | |
| 2024/0006899 A1 | 1/2024 | Wernerus | |
| 2024/0006993 A1 | 1/2024 | Barjati et al. | |
| 2024/0022187 A1 | 1/2024 | Fassnacht | |
| 2024/0022240 A1 | 1/2024 | Balaz | |
| 2024/0022244 A1 | 1/2024 | S et al. | |
| 2024/0030730 A1 | 1/2024 | Wernerus | |

(56) References Cited

U.S. PATENT DOCUMENTS

| | | |
|---|---|---|
| 2024/0039062 A1 | 2/2024 | Wernerus |
| 2024/0039402 A1 | 2/2024 | Bafna et al. |
| 2024/0039406 A1 | 2/2024 | Chen et al. |
| 2024/0048048 A1 | 2/2024 | Zhang |
| 2024/0055488 A1 | 2/2024 | Lee et al. |
| 2024/0067116 A1 | 2/2024 | Qiu |
| 2024/0072675 A1 | 2/2024 | Formenti et al. |
| 2024/0072817 A1 | 2/2024 | K et al. |
| 2024/0077899 A1 | 3/2024 | Chitnis et al. |
| 2024/0078204 A1 | 3/2024 | Roehrle et al. |
| 2024/0079950 A1 | 3/2024 | Narayanasamy |
| 2024/0079958 A1 | 3/2024 | Kumar et al. |
| 2024/0080028 A1 | 3/2024 | Dake et al. |
| 2024/0088647 A1 | 3/2024 | Ramadass et al. |
| 2024/0088896 A1 | 3/2024 | Bilhan et al. |
| 2024/0097437 A1 | 3/2024 | Goyal et al. |
| 2024/0097459 A1 | 3/2024 | Swoboda et al. |
| 2024/0105276 A1 | 3/2024 | Duryea |
| 2024/0106248 A1 | 3/2024 | Woll et al. |
| 2024/0106435 A1 | 3/2024 | Zhang et al. |
| 2024/0113517 A1 | 4/2024 | Sriraj et al. |
| 2024/0113611 A1 | 4/2024 | Kaufmann et al. |
| 2024/0113620 A1 | 4/2024 | Ranmuthu et al. |
| 2024/0113624 A1 | 4/2024 | Southard et al. |
| 2024/0120558 A1 | 4/2024 | Zhang et al. |
| 2024/0120765 A1 | 4/2024 | Oner et al. |
| 2024/0120962 A1 | 4/2024 | Miriyala et al. |
| 2024/0128851 A1 | 4/2024 | Ruck et al. |
| 2024/0128859 A1 | 4/2024 | Chen |
| 2024/0128867 A1 | 4/2024 | Wang et al. |
| 2024/0146177 A1 | 5/2024 | Mehdi et al. |
| 2024/0146306 A1 | 5/2024 | Ramkaj et al. |
| 2024/0149734 A1 | 5/2024 | Eisenlauer |
| 2024/0162723 A1 | 5/2024 | Zipf et al. |
| 2024/0178756 A1 | 5/2024 | El-Markhi et al. |
| 2024/0178824 A1 | 5/2024 | Kazama et al. |
| 2024/0186803 A1 | 6/2024 | Krieg et al. |
| 2024/0198937 A1 | 6/2024 | Benqassmi et al. |
| 2024/0198938 A1 | 6/2024 | Carlos et al. |
| 2024/0204540 A1 | 6/2024 | Majmunovic et al. |
| 2024/0204541 A1 | 6/2024 | Majmunovic et al. |
| 2024/0204671 A1 | 6/2024 | Liu et al. |
| 2024/0204765 A1 | 6/2024 | Dake |
| 2024/0213874 A1 | 6/2024 | Junnarkar et al. |
| 2024/0213971 A1 | 6/2024 | Lee |
| 2024/0213975 A1 | 6/2024 | Narayanasamy |
| 2024/0213981 A1 | 6/2024 | Agarwal et al. |

FOREIGN PATENT DOCUMENTS

| | | |
|---|---|---|
| WO | 2019034505 A1 | 2/2019 |
| WO | 2020156820 A1 | 8/2020 |
| WO | 2020239797 A1 | 12/2020 |
| WO | 2021110405 A1 | 6/2021 |
| WO | 2021213728 A1 | 10/2021 |
| WO | 2022012943 A1 | 1/2022 |
| WO | 2022229149 A1 | 11/2022 |
| WO | 2023006491 A1 | 2/2023 |
| WO | 2023046607 A1 | 3/2023 |
| WO | 2023094053 A1 | 6/2023 |
| WO | 2023110991 A1 | 6/2023 |
| WO | 2023147907 A1 | 8/2023 |
| WO | 2023151850 A1 | 8/2023 |
| WO | 2023227278 A1 | 11/2023 |
| WO | 2023237248 A1 | 12/2023 |
| WO | 2024006181 A2 | 1/2024 |
| WO | 2024012743 A1 | 1/2024 |
| WO | 2024012744 A1 | 1/2024 |
| WO | 2024022219 A1 | 2/2024 |
| WO | 2024041776 A1 | 2/2024 |
| WO | 2024046614 A1 | 3/2024 |
| WO | 2024049730 A1 | 3/2024 |
| WO | 2024049884 A1 | 3/2024 |
| WO | 2024049909 A1 | 3/2024 |
| WO | 2024056388 A1 | 3/2024 |
| WO | 2024068065 A1 | 4/2024 |
| WO | 2024068076 A1 | 4/2024 |
| WO | 2024068113 A1 | 4/2024 |
| WO | 2024068115 A1 | 4/2024 |
| WO | 2024083391 A1 | 4/2024 |
| WO | 2024093384 A1 | 5/2024 |
| WO | 2024104970 A1 | 5/2024 |
| WO | 2024108401 A1 | 5/2024 |
| WO | 2024110106 A1 | 5/2024 |
| WO | 2024110265 A1 | 5/2024 |
| WO | 2024110297 A1 | 5/2024 |
| WO | 2024114978 A1 | 6/2024 |
| WO | 2024114979 A1 | 6/2024 |
| WO | 2024114980 A1 | 6/2024 |
| WO | 2024128286 A1 | 6/2024 |
| WO | 2024132249 A1 | 6/2024 |

OTHER PUBLICATIONS

Baranwal, S., "Common-mode transient immunity for isolated gate drivers," Analog Applications Journal, Texas Instruments (2015), Retrieved from internet URL: https://www.ti.com/lit/an/slyt648/slyt648.pdf?ts=1702052336068ref_url=https%253A%252F%252Fwww.google.com%252F, 07 pages.

Boomer, K. and Ahmad H., "Performance Evaluation of an Automotive-Grade, High-Speed Gate Driver for SiC FETs, Type UCC27531, Over a Wide Temperature Range," NASA Electronic Parts and Packaging Program No. GRC-E-DAA-TN25898 (2015), Retrieved from Internet URL: https://ntrs.nasa.gov/api/citations/20150023034/downloads/20150023034.pdf, 08 pages.

Ke, X, et al., "A 3-to-40V 10-to-30MHz Automotive-Use GaN Driver with Active BST Balancing and VSW Dual-Edge Dead-Time Modulation Achieving 8.3% Efficiency Improvement and 3.4ns Constant Propagation Delay," 2016 IEEE International Solid-State Circuits Conference (ISSCC), IEEE, 2016, Retrieved from internet URL: https://picture.iczhiku.com/resource/IEEE/WYkrsJrSQPoSjNXm.pdf, 03 pages.

Sridhar, N., "Impact of an Isolated Gate Driver," Texas Instruments: Dallas, Texas (2019), Retrieved from Internet URL: https://www.ti.com/lit/wp/slyy140a/slyy140a.pdf, 08 pages.

Sridhar, N., "Power Electronics in Motor Drives: Where is it?" Texas Instruments (2015), Retrieved from Internet URL: https://www.ti.com/lit/wp/slyy078a/slyy078a.pdf, 09 pages.

Sridhar, N., "Silicon Carbide Gate Drivers—a Disruptive Technology in Power Electronics," Texas Instruments, Dallas, Texas (2019), Retrieved from Internet URL: https://www.ti.com/lit/wp/slyy139/slyy139.pdf, 07 pages.

Maniar, K., et al., "Addressing High-voltage Design Challenges With Reliable and Affordable Isolation Technologies," 2024, pp. 1-12. Retrieved from internet URL: https://www.ti.com/lit/wp/slyy204c/slyy204c.pdf ts=171050812761&ref_url=https%253A%252F%252Fwww.google.com%252F.

"New products," 5 Pages, Retrieved from internet URL:https://www.ti.com/product-category/new-products.html?%20releasePeriod=364#releasePeriod=90.

"Qualcomm and Bosch Showcase New Central Vehicle Computer for Digital Cockpit and Driver Assistance Functions at CES 2024," 2024, 8 Pages. Retrieved from internet URL:https://www.qualcomm.com/news/releases/2024/01/qualcomm-and-bosch-showcase-new-central-vehicle-computer-for-dig.

* cited by examiner

SYSTEMS AND METHODS FOR SENSING TEMPERATURE OF INVERTER FOR ELECTRIC VEHICLE

CROSS-REFERENCE TO RELATED APPLICATION(S)

This application claims the benefit of priority to U.S. Provisional Patent Application No. 63/377,486, filed Sep. 28, 2022, U.S. Provisional Patent Application No. 63/377, 501, filed Sep. 28, 2022, U.S. Provisional Patent Application No. 63/377,512, filed Sep. 28, 2022, and U.S. Provisional Patent Application No. 63/378,601, filed Oct. 6, 2022, the entireties of which are incorporated by reference herein.

TECHNICAL FIELD

Various embodiments of the present disclosure relate generally to systems and methods for sensing a temperature of an inverter for an electric vehicle, and, more particularly, to systems and methods of sensing a temperature of a power module, including a phase switch, for an inverter for an electric vehicle.

BACKGROUND

Inverters, such as those used to drive a motor in an electric vehicle, for example, are responsible for converting High Voltage Direct Current (HVDC) into Alternating Current (AC) to drive the motor. In an inverter, high temperatures can contribute to inefficiencies in the inverter.

The present disclosure is directed to overcoming one or more of these above-referenced challenges.

SUMMARY OF THE DISCLOSURE

In some aspects, the techniques described herein relate to a system including: an inverter configured to convert DC power from a battery to AC power to drive a motor, wherein the inverter includes: a power module including a drain terminal and a source terminal; one or more phase switches configured to control a current flow between the drain terminal and the source terminal; and a point-of-use controller including two or more thermal sensors on the point-of-use controller, the point-of-use controller configured to determine a temperature of the one or more phase switches using the two or more thermal sensors.

In some aspects, the techniques described herein relate to a system, wherein the point-of-use controller is an application-specific integrated circuit.

In some aspects, the techniques described herein relate to a system, wherein the point-of-use controller is a gate driver for the one or more phase switches.

In some aspects, the techniques described herein relate to a system, wherein the one or more phase switches include one or more silicon carbide dies.

In some aspects, the techniques described herein relate to a system, wherein each of the two or more thermal sensors includes a stack of diodes having a voltage drop with a negative temperature coefficient.

In some aspects, the techniques described herein relate to a system, wherein the point-of-use controller is configured to determine the temperature of the one or more phase switches using respective absolute temperatures of the two or more thermal sensors and a difference between the respective absolute temperatures of the two or more thermal sensors.

In some aspects, the techniques described herein relate to a system, wherein the point-of-use controller is configured to determine the temperature of the one or more phase switches using a temperature gradient of the point-of-use controller using the two or more thermal sensors.

In some aspects, the techniques described herein relate to a system, further including: the battery configured to supply the DC power to the inverter; and the motor configured to receive the AC power from the inverter to drive the motor.

In some aspects, the techniques described herein relate to a system including: a power module for an inverter configured to convert DC power to AC power, the power module including a drain terminal and a source terminal; one or more phase switches configured to control a current flow between the drain terminal and the source terminal; and a point-of-use controller including two or more thermal sensors on the point-of-use controller, the point-of-use controller configured to determine a temperature of the one or more phase switches using the two or more thermal sensors.

In some aspects, the techniques described herein relate to a system, wherein the point-of-use controller is an application-specific integrated circuit gate driver for the one or more phase switches.

In some aspects, the techniques described herein relate to a system, wherein the one or more phase switches include one or more silicon carbide dies.

In some aspects, the techniques described herein relate to a system, wherein each of the two or more thermal sensors includes a stack of diodes having a voltage drop with a negative temperature coefficient.

In some aspects, the techniques described herein relate to a system, wherein the point-of-use controller is configured to determine the temperature of the one or more phase switches using respective absolute temperatures of the two or more thermal sensors and a difference between the respective absolute temperatures of the two or more thermal sensors.

In some aspects, the techniques described herein relate to a system, wherein the point-of-use controller is configured to determine the temperature of the one or more phase switches using a temperature gradient of the point-of-use controller using the two or more thermal sensors.

In some aspects, the techniques described herein relate to a system including one or more controllers including: a first thermal sensor at a first location on the one or more controllers; and a second thermal sensor at a second location on the one or more controllers, wherein the one or more controllers are configured to determine a temperature of a component outside the one or more controllers using the first thermal sensor and the second thermal sensor.

In some aspects, the techniques described herein relate to a system, wherein the one or more controllers are configured to: determine a first temperature difference between the first thermal sensor and the second thermal sensor at a first time, determine a second temperature difference between the first thermal sensor and the second thermal sensor at a second time, and determine the temperature of the component based on the first temperature difference and the second temperature difference.

In some aspects, the techniques described herein relate to a system, wherein the one or more controllers are further configured to: determine the temperature of the component based on the first temperature difference, the second temperature difference, and a slope of a gradient between the first temperature difference and the second temperature difference.

In some aspects, the techniques described herein relate to a system, wherein the one or more controllers are further configured to: determine the temperature of the component based on the first temperature difference, the second temperature difference, a slope of a gradient between the first temperature difference and the second temperature difference, and a layout geometry of the component.

In some aspects, the techniques described herein relate to a system, wherein the one or more controllers are further configured to: determine the temperature of the component based on the first temperature difference, the second temperature difference, and a rate of change between the first temperature difference and the second temperature difference.

In some aspects, the techniques described herein relate to a system, wherein the one or more controllers are further configured to: determine the temperature of the component based on a temperature of the first thermal sensor, the first temperature difference, and the second temperature difference.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
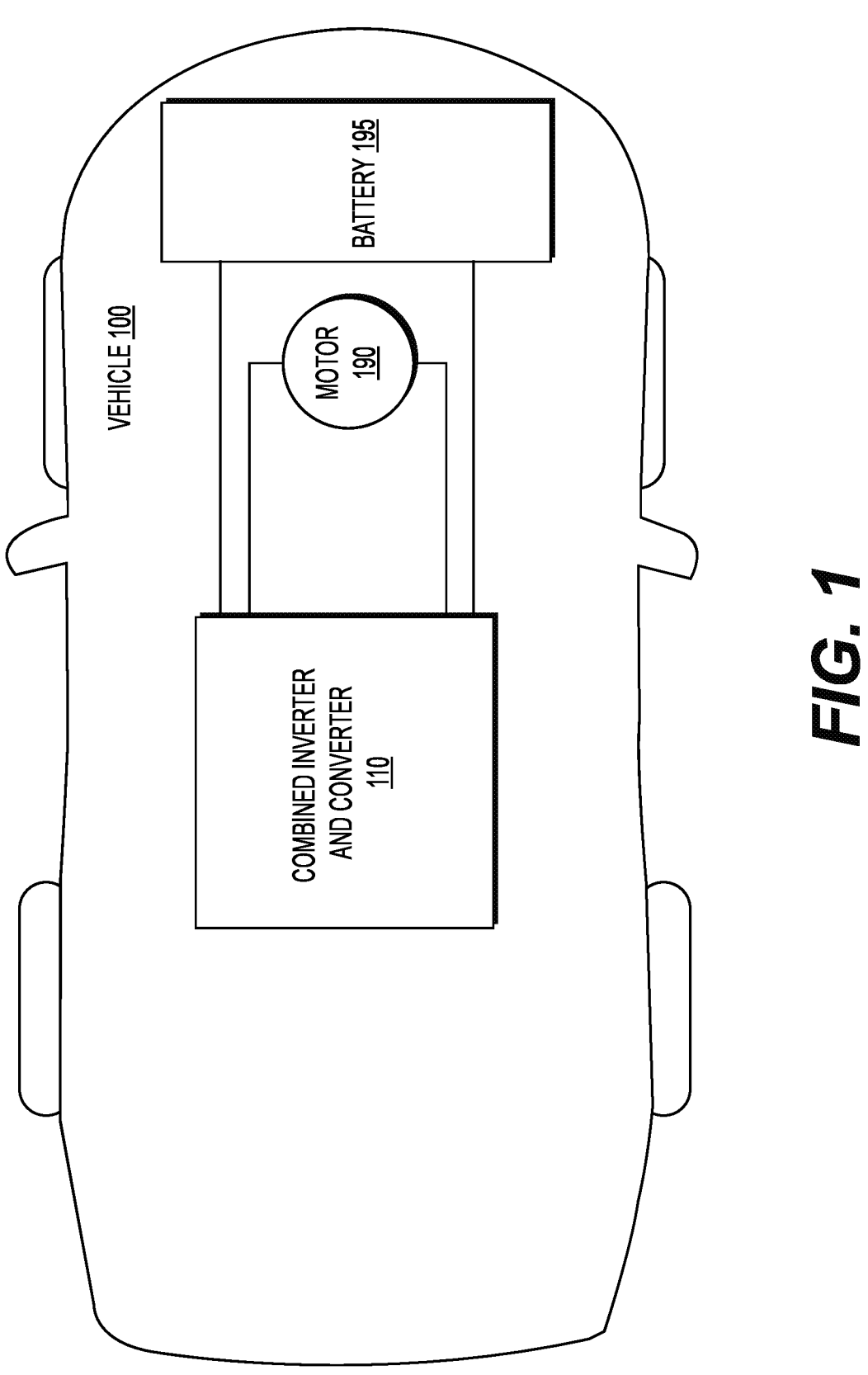
FIG. 1 depicts an exemplary system infrastructure for a vehicle including a combined inverter and converter, according to one or more embodiments.

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value. In this disclosure, unless stated otherwise, any numeric value may include a possible variation of ±10% in the stated value.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. For example, in the context of the disclosure, the switching devices may be described as switches or devices, but may refer to any device for controlling the flow of power in an electrical circuit. For example, switches may be metal-oxide-semiconductor field-effect transistors (MOSFETs), bipolar junction transistors (BJTs), insulated-gate bipolar transistors (IGBTs), or relays, for example, or any combination thereof, but are not limited thereto.

Various embodiments of the present disclosure relate generally to systems and methods for sensing a temperature of an inverter for an electric vehicle, and, more particularly, to systems and methods of sensing a temperature of a power module, including a phase switch, for an inverter for an electric vehicle.

Inverters, such as those used to drive a motor in an electric vehicle, for example, are responsible for converting High Voltage Direct Current (HVDC) into Alternating Current (AC) to drive the motor. A three phase inverter may include a bridge with six power device switches (for example, power transistors such as IGBT or MOSFET) that are controlled by Pulse Width Modulation (PWM) signals generated by a controller. An inverter may include three half-H bridge switches to control the phase voltage, upper and lower gate drivers to control the switches, a PWM controller, and glue logic between the PWM controller and the gate drivers. The PWM controller may generate signals to define the intended states of the system. The gate drivers may send the signals from the PWM controller to the half-H bridge switches. The half-H bridge switches may drive the phase voltage. The inverter may include an isolation barrier between low voltage and high voltage planes. Signals may pass from the PWM controller to the half-H bridge switches by passing across the isolation barrier, which may employ optical, transformer-based, or capacitance-based isolation. PWM signals may be distorted when passing through the glue logic, which may include resistive, capacitive, or other types of filtering. PWM signals may be distorted when passing through the gate driver, due to the galvanic isolation barrier and other delays within the gate driver. PWM signals may be distorted when the signals processed by the half-H switch via the gate driver output.

Gate drivers may tolerate common-mode transients that occur during field-effect transistor (FET) switching and when one side of the floating high voltage terminal is shorted to ground or subject to an electro-static discharge. These voltage transients may result in fast edges, which may create bursts of common-mode current through the galvanic isolation. A gate driver may need to demonstrate common-mode transient immunity (CMTI) in order to be effective and safe.

Gate drivers may have a high-voltage domain in common to the voltage plane of an associated FET. Further, high-voltage planes may be supplied by a flyback converter that may be isolated through a transformer from the low-voltage plane. The high-voltage domain supply may be used to power circuits which source and sink gate current to drive the FET and which may detect FET faults so the faults can be acted upon and/or communicated to the low-voltage domain. Gate drivers may include a galvanic channel dedicated to FET commands, and one or more bidirectional or unidirectional galvanic channels dedicated to FET communications.

High current switching transients may create strong electro-magnetic (EM) fields that may couple into nearby metal traces. The magnitude and frequency of coupled currents may depend upon the layout of the FET packaging solution and the direction and length of metal traces between the FET and the control integrated circuit (IC). For example, typical values for coupled currents may be up to 1 A at AC frequencies up to 100 MHz. Typically, within a circuit, the gate driver IC may be placed far enough away from the FET that high EM fields do not couple directly into the internal metal traces within the gate driver IC. The gate driver is placed a distance from EM fields such that induced currents within the circuitry are below levels that will cause malfunction of the gate driver, or a metal shield is placed between the gate driver and the source of EM fields to protect the gate driver circuitry. The output terminals of the gate driver that connect to the FET are exposed to the EM fields at the point where the output terminals are no longer covered by a shield. The gate driver switches large currents (such as 5 A to 15 A, for example) through these exposed terminals. The switched large currents are generally greater in magnitude than the EM-induced currents. The gate driver is able to overdrive the induced currents to maintain control of the FETs. The high side of the gate drivers and the FET may share a common ground and a gate control signal trace, both of which may be susceptible to coupled currents.

Gate drivers may turn on low-resistance switches to source and sink gate currents. Series resistors may sometimes be added to limit gate current. Switched gate currents may be larger than coupled currents in order to maintain control of their respective FETs.

Gate drivers may be able to sense FET operating voltages or currents in order to provide feedback and react to faults. Over-current faults may typically be detected by sensing the FET drain to source voltage and comparing the sensed voltage to a reference value. Sensed voltages may be heavily filtered to reject coupled currents. Filtering may slow down the response to fault conditions, resulting in delays in response. For example, the rate of current increase due to a low resistance short circuit may reach damaging levels prior to being detected by the heavily filtered drain to source voltage detection strategy. The resulting short circuit may damage the FET or the vehicle, prior to being detected and shut off.

According to one or more embodiments, a FET driver circuit may provide rapid over-current detection by either shunt current sensing or by diverting a fraction of the load current through a parallel FET that may have a current sensing circuit. Utilizing either strategy may require a "point-of-use IC" where sensing circuitry is in close proximity to the FET. Even if a point-of-use IC and a remote controller are resistant to EM fields, communication between the point-of-use IC and remote controller remains susceptible to induced currents. Point-of-use ICs have been implemented in low EM field applications, such as smart FETs for automotive applications. However, point-of-use ICs have not been used in high EM field applications. A high EM field may be a field (i) that induces a current within an IC that is in excess of an operating current of the IC and leads to malfunction, or (ii) that induces a differential voltage within an IC which is in excess of the operating differential voltage and leads to malfunction. A high EM field may be a field that is greater than approximately 10 A or approximately 100V, for example.

A point-of-use controller may be on a power module including a phase switch. The temperature of the phase switch and/or power module may be an important factor in the control of the inverter. A phase switch may include one or more silicon carbide (SiC) dies, for example. One or more embodiments may allow for temperature dependent gate drive profiles of the phase switch to reduce switching losses and extend battery range.

Some systems may use a thermistor to monitor the SiC die temperature. The thermistor may be located a distance away from the SiC die, so there may be a temperature difference between the die and the thermistor. With a thermistor, the total error stack-up between a predicted actual temperature and the measured temperature may between +/−15° C. to +/−11° C. At lower temperatures, some systems with a thermistor may lose the ability to measure the temperature due to a lack of range of the measurement circuitry.

One or more embodiments may include a point-of use controller, such as an integrated gate driver ASIC, for example. The ASIC may precisely measure a temperature using on-chip integrated trimmed thermal sensors. The on-chip thermal sensors may measure the absolute ASIC temperature to within tolerances of +/− approximately 1.5° C. The thermal sensors on the ASIC may be arranged in such a manner to measure temperature gradients across the ASIC. One or more embodiments may use the absolute measured ASIC temperature in conjunction with the temperature gradients across the ASIC to accurately predict the SiC die temperature within +/− approximately 5° C. One or more embodiments may use a rate of change of the temperature difference between ASIC thermal sensors to improve the response time of the predicted SiC die temperature.

Relative to thermistor-based systems, one or more embodiments may provide a much tighter temperature measurement of the SiC die, such as within +/− approximately 5° C., for example. Relative to thermistor-based systems, one or more embodiments may require a reduced margin of operation due to tighter tolerances of measured temperature, which may reduce the cost and/or complexity of the system. Relative to thermistor-based systems, one or more embodiments may allow power modules to operate at higher average temperatures. Relative to thermistor-based systems, one or more embodiments may provide a smaller overall SiC die area and/or lower cost heat sinks.

One or more embodiments may allow modified gate drive profiles based upon SiC temperature, which may reduce switching loss and extend battery range. SiC gate threshold voltage and transconductance both decrease with temperature. If the temperature of the SiC is determined, then the gate drive profile may be modified to achieve lower switching losses at a given temperature. This profile modification may require a sophisticated gate driver that can provide gate current breakpoints as a function of driven gate-to-source voltage. The more precisely the temperature is measured, the better a gate drive profile may be adapted to temperature.

One or more embodiments may allow for temperature-based control of the power module during a bulk capacitance discharge. Bulk capacitor discharge at turn off is a function where the bulk capacitor is discharged quickly after the battery contactors are opened. This bulk capacitance discharge reduces the risk of contact with high voltages. Bulk capacitor discharge may transfer energy from the bulk capacitor (e.g. 700 μF*800 $V^2$) to the power switches, and should be accomplished in a controlled manner. Using the temperature of the SiC devices during bulk capacitance discharge may reduce a discharge time while protecting the SiC devices from excessive temperature rise.

One or more embodiments may provide a Vbe error in a thermal sensor of +/− approximately 1.6° C. One or more embodiments may provide a buffer error from a thermal sensor of +/− approximately 0.225° C. One or more embodiments may provide a GND error of +/− approximately 0.0625° C. One or more embodiments may provide a VDDL error in a thermal sensor of approximately 0.356° C. from −40° C. to 165° C. One or more embodiments may provide a VDDL transient error of +/− approximately 1.25° C. One or more embodiments may provide an ADC integral non-linearity error of approximately 0.125° C. from −40° C. to 165° C. One or more embodiments may provide an ADC effective number of bits with twelve bits of accuracy, where 400 uV equals+/− approximately 0.1° C. One or more embodiments may provide a trim and test error of +/− approximately 1.5° C. One or more embodiments may provide an error without chuck and VDDL transient error and including half of thermal sensor and integral nonlinearity error (spread as a function of temperature transient) of +/− approximately 2.128° C. One or more embodiments may provide an error with chuck measurement error in addition to the above error of +/− approximately 3.628° C.

Accurately understanding SiC device temperature within a power module may allow the power module to be optimized for reliability and efficiency. One or more embodiments may provide a power module incorporating a SiC FET bare die along with an integrated gate driver ASIC. Multiple thermal sense points on the ASIC may be used to sense the absolute temperature of the ASIC along with the thermal gradient between the ASIC's thermal sense points. The thermal sense points may be arranged on the ASIC in an advantageous manner such that the absolute temperature and thermal gradient measurements may be used to estimate the temperature of an adjacent SiC die. The rate of change of the thermal gradient with respect to time may also be used to improve the response time of the estimate.

Precise temperature sensing of the SiC FET bare die may allow the overall system to be optimized for cost and efficiency. Some systems may use a thermistor placed within the power module. The thermistor allows the temperature to be measured in the physical location of the thermistor, which in application may be as much as 20° C. cooler than an adjacent SiC die. In addition, there may be significant coupling that occurs between the high current and high voltage lines, and the thermistor requires heavy filtering of the monitoring signal, which may greatly reduce response time.

One or more embodiments may provide an apparatus and method to precisely estimate the temperature of a SiC device within a power module. One or more embodiments may provide a gate driver ASIC that is integrated into the power module along with the bare die.

With an integrated ASIC gate driver IC, multiple thermal sensors may be located across the ASIC. The temperature of these on-chip trimmed thermal sensors may be precisely measured. In addition, these thermal sensors may be arranged across the ASIC in such a manner to measure the temperature gradients across the die. One or more embodiments may use the absolute measured ASIC die temperature in conjunction with the temperature gradients across the ASIC to accurately predict the SiC die temperature within +/− approximately 5° C. Additionally, the rate of change of the temperature difference between ASIC die sensors may be used to improve the response time of the predicted SiC die temperature.

One or more embodiments may provide an integrated gate driver located inside a power module. The integrated gate driver may be an ASIC. The ASIC may include two thermal sensors on the ASIC, which may be labeled as TREF and TSENSE. The thermal sensors may be constructed of a stack of diodes having a voltage drop with a negative temperature coefficient. However, the disclosure is not limited thereto, and may include other ways to construct thermal sensors within an ASIC.

The temperatures of the thermal sensors may be precisely measured at a known sampling rate. The absolute temperatures of the sensors may be monitored, as well as the difference between the thermal sensor temperatures. The equations 1-5 below may be used to predict the temperature of the adjacent SiC die temperature.

$$\Delta T_N = T_{SENSE_N} - T_{REF_N} \qquad \text{Equation 1:}$$

$$\beta_N = (\Delta T_N - \Delta T_{N-1}) * f_s \qquad \text{Equation 2:}$$

$$S(\beta_N) = \alpha \text{ for } 0 < |\beta_N| < A \qquad \text{Equation 3:}$$

$$S(\beta_N) = \gamma \text{ for } |\beta_N| >= A \qquad \text{Equation 4:}$$

$$T_{M_N} = (\Delta T_N - B) * C + \beta_N * S(\beta_N) + T_{SENSE_N} \qquad \text{Equation 5:}$$

In the equations 1-5 above, $\Delta T_N$ may be a temperature gradient across the ASIC at a given sample time N, $T_{REF_N}$ may be a temperature recorded by a first temperature sensor at time N, $T_{SENSE_N}$ may be a temperature recorded by a second temperature sensor at time N, $\beta_N$ may be a slope of the gradient from one temperature sample to the next with respect to time, $f_s$ may represent a sampling rate, $\alpha$, $\gamma$, A, B, and C may be constants based on layout geometry and temperature, and $T_{M_N}$ may be a predicted temperature of an adjacent SiC die.

One or more embodiments may provide a thermal measurement apparatus including diode stacks and an analog to digital converter (ADC). However, the disclosure is not limited thereto. One or more embodiments may provide a system to precisely estimate the temperature of an adjacent SiC die located within a power module. One or more embodiments may provide a system to operate an average SiC die at higher temperature, due to the ability to have a much tighter standard deviation than other systems, such as those using a thermistor, for example. One or more embodiments may provide a system with improved accuracy, which may allow the system design to be optimized due to the reduced margin of error.

FIG. 1 depicts an exemplary system infrastructure for a vehicle including a combined inverter and converter, according to one or more embodiments. In the context of this disclosure, the combined inverter and converter may be referred to as an inverter. As shown in FIG. 1, electric vehicle 100 may include an inverter 110, a motor 190, and a battery 195. The inverter 110 may include components to receive electrical power from an external source and output electrical power to charge battery 195 of electric vehicle 100. The inverter 110 may convert DC power from battery 195 in electric vehicle 100 to AC power, to drive motor 190 of the electric vehicle 100, for example, but the embodiments are not limited thereto. The inverter 110 may be bidirectional, and may convert DC power to AC power, or convert AC power to DC power, such as during regenerative braking, for example. Inverter 110 may be a three-phase inverter, a single-phase inverter, or a multi-phase inverter.

Figure 2:
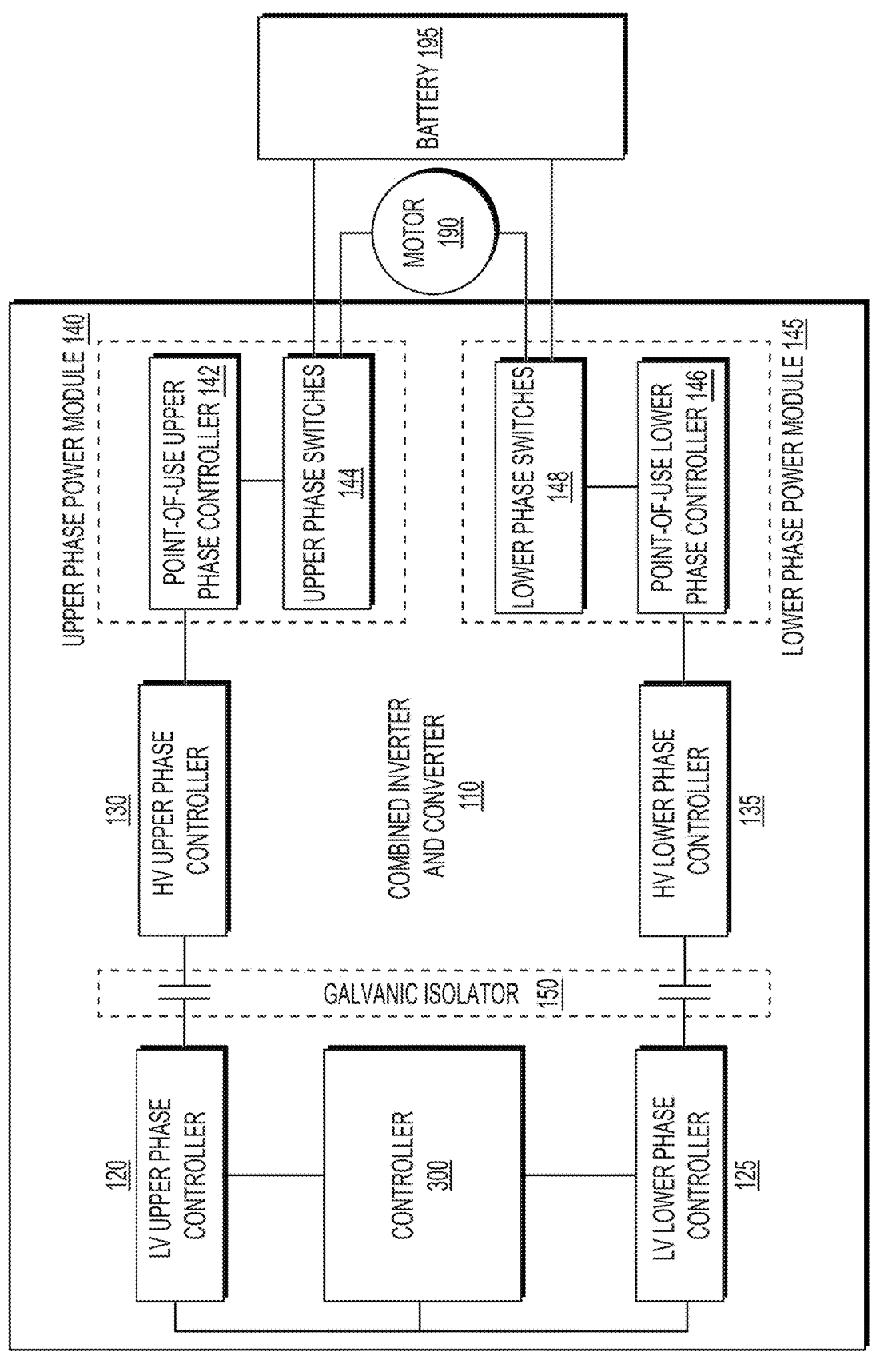
FIG. 2 depicts an exemplary system infrastructure for the combined inverter and converter of FIG. 1 with a point-of-use switch controller, according to one or more embodiments.

FIG. 2 depicts an exemplary system infrastructure for the inverter 110 of FIG. 1 with a point-of-use switch controller, according to one or more embodiments. Electric vehicle 100 may include inverter 110, motor 190, and battery 195. Inverter 110 may include an inverter controller 300 (shown in FIG. 3) to control the inverter 110. Inverter 110 may include a low voltage upper phase controller 120 separated from a high voltage upper phase controller 130 by a galvanic isolator 150, and an upper phase power module 140. Upper phase power module 140 may include a point-of-use upper phase controller 142 and upper phase switches 144. Inverter 110 may include a low voltage lower phase controller 125 separated from a high voltage lower phase controller 135 by galvanic isolator 150, and a lower phase power module 145. Lower phase power module 145 may include a point-of-use lower phase controller 146 and lower phase switches 148. Upper phase switches 144 and lower phase switches 148 may be connected to motor 190 and battery 195. Galvanic isolator 150 may be one or more of optical, transformer-based, or capacitance-based isolation. Galvanic isolator 150 may be one or more capacitors with a value from approximately 20 fF to approximately 100 fF, with a breakdown voltage from approximately 6 kV to approximately 12 kV, for example. Galvanic isolator 150 may include a pair of capacitors, where one capacitor of the pair carries an inverse data signal from the other capacitor of the pair to create a differential signal for common-mode noise rejection. Galvanic isolator 150 may include more than one capacitor in series. Galvanic isolator 150 may include one capacitor located on a first IC, or may include a first capacitor located on a first IC and a second capacitor located on a second IC that communicates with the first IC.

Inverter 110 may include a low voltage area, where voltages are generally less than 5V, for example, and a high voltage area, where voltages may exceed 500V, for example. The low voltage area may be separated from the high voltage area by galvanic isolator 150. Inverter controller 300 may be in the low voltage area of inverter 110, and may send signals to and receive signals from low voltage upper phase controller 120. Low voltage upper phase controller 120 may be in the low voltage area of inverter 110, and may send signals to and receive signals from high voltage upper phase controller 130. Low voltage upper phase controller 120 may send signals to and receive signals from low voltage lower phase controller 125. High voltage upper phase controller 130 may be in the high voltage area of inverter 110. Accordingly, signals between low voltage upper phase controller 120 and high voltage upper phase controller 130 pass through galvanic isolator 150. High voltage upper phase controller 130 may send signals to and receive signals from point-of-use upper phase controller 142 in upper phase power module 140. Point-of-use upper phase controller 142 may send signals to and receive signals from upper phase switches 144. Upper phase switches 144 may be connected to motor 190 and battery 195. Upper phase switches 144 and lower phase switches 148 may be used to transfer energy from motor 190 to battery 195, from battery 195 to motor 190, from an external source to battery 195, or from battery 195 to an external source, for example. The lower phase system of inverter 110 may be similar to the upper phase system as described above.

Figure 3:
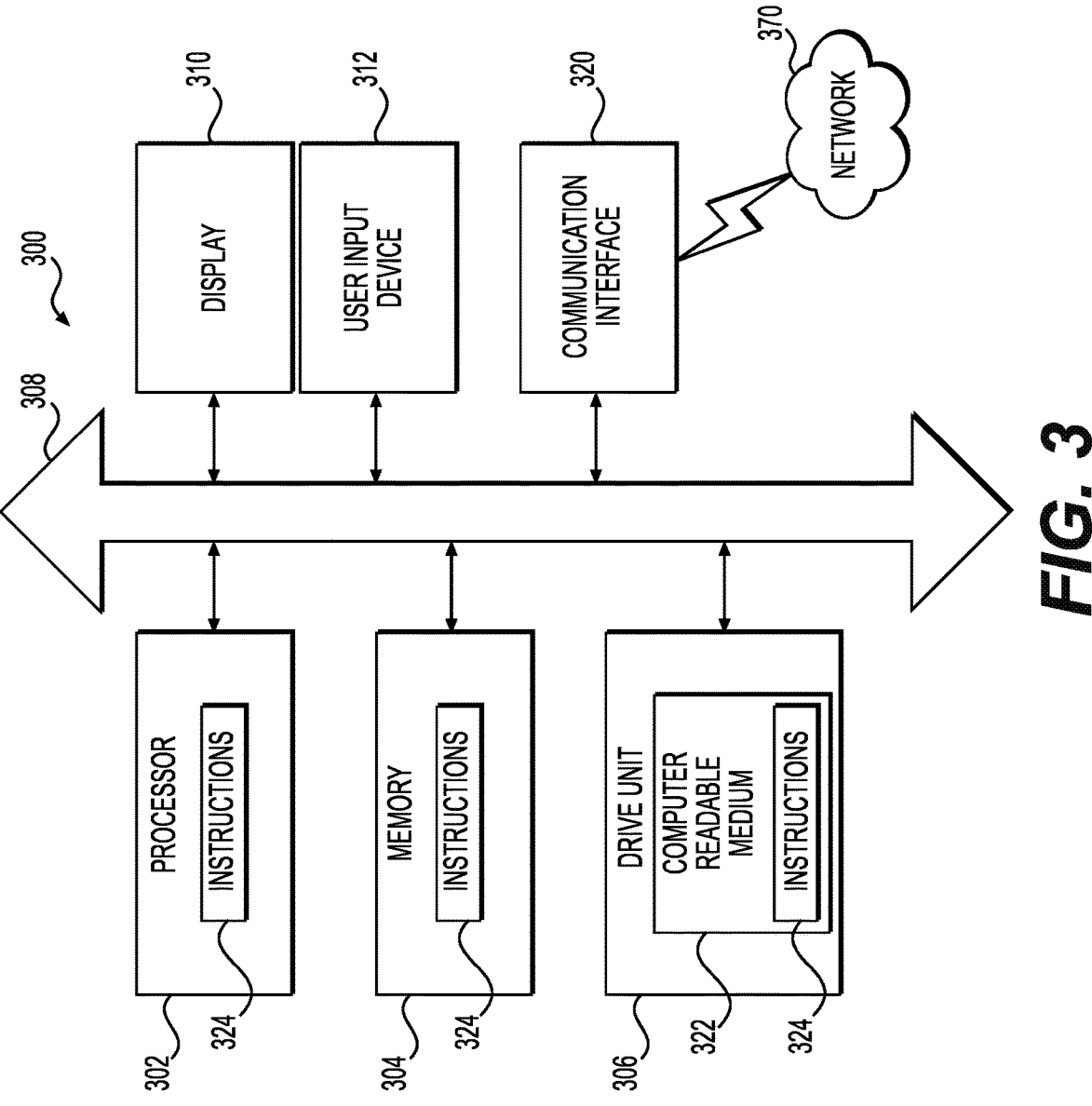
FIG. 3 depicts an exemplary system infrastructure for the controller of FIG. 2, according to one or more embodiments.

FIG. 3 depicts an exemplary system infrastructure for inverter controller 300 of FIG. 2, according to one or more embodiments. Inverter controller 300 may include one or more controllers.

The inverter controller 300 may include a set of instructions that can be executed to cause the inverter controller 300 to perform any one or more of the methods or computer based functions disclosed herein. The inverter controller 300 may operate as a standalone device or may be connected, e.g., using a network, to other computer systems or peripheral devices.

In a networked deployment, the inverter controller 300 may operate in the capacity of a server or as a client in a server-client user network environment, or as a peer computer system in a peer-to-peer (or distributed) network environment. The inverter controller 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the inverter controller 300 can be implemented using electronic devices that provide voice, video, or data communication. Further, while the inverter controller 300 is illustrated as a single system, the term "system" shall also be taken to include any collection of systems or sub-systems that individually or jointly execute a set, or multiple sets, of instructions to perform one or more computer functions.

As shown in FIG. 3, the inverter controller 300 may include a processor 302, e.g., a central processing unit (CPU), a graphics processing unit (GPU), or both. The processor 302 may be a component in a variety of systems. For example, the processor 302 may be part of a standard inverter. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The inverter controller 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 304 includes a cache or random-access memory for the processor 302. In alternative implementations, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the processor 302 executing the instructions stored in the memory 304. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the inverter controller 300 may further include a display 310, such as a liquid crystal display (LCD), an organic light emitting diode (OLED), a flat panel display, a solid-state display, a cathode ray tube (CRT), a projector, a printer or other now known or later developed display device for outputting determined information. The display 310 may act as an interface for the user to see the functioning of the processor 302, or specifically as an interface with the software stored in the memory 304 or in the drive unit 306.

Additionally or alternatively, the inverter controller 300 may include an input device 312 configured to allow a user to interact with any of the components of inverter controller 300. The input device 312 may be a number pad, a keyboard, or a cursor control device, such as a mouse, or a joystick, touch screen display, remote control, or any other device operative to interact with the inverter controller 300.

The inverter controller 300 may also or alternatively include drive unit 306 implemented as a disk or optical drive. The drive unit 306 may include a computer-readable medium 322 in which one or more sets of instructions 324, e.g. software, can be embedded. Further, the instructions 324 may embody one or more of the methods or logic as described herein. The instructions 324 may reside completely or partially within the memory 304 and/or within the processor 302 during execution by the inverter controller 300. The memory 304 and the processor 302 also may include computer-readable media as discussed above.

In some systems, a computer-readable medium 322 includes instructions 324 or receives and executes instructions 324 responsive to a propagated signal so that a device connected to a network 370 can communicate voice, video, audio, images, or any other data over the network 370. Further, the instructions 324 may be transmitted or received over the network 370 via a communication port or interface 320, and/or using a bus 308. The communication port or interface 320 may be a part of the processor 302 or may be a separate component. The communication port or interface 320 may be created in software or may be a physical connection in hardware. The communication port or interface 320 may be configured to connect with a network 370, external media, the display 310, or any other components in inverter controller 300, or combinations thereof. The connection with the network 370 may be a physical connection, such as a wired Ethernet connection or may be established wirelessly as discussed below. Likewise, the additional connections with other components of the inverter controller 300 may be physical connections or may be established wirelessly. The network 370 may alternatively be directly connected to a bus 308.

While the computer-readable medium 322 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 322 may be non-transitory, and may be tangible.

The computer-readable medium 322 can include a solid-state memory such as a memory card or other package that houses one or more non-volatile read-only memories. The computer-readable medium 322 can be a random-access memory or other volatile re-writable memory. Additionally or alternatively, the computer-readable medium 322 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The inverter controller 300 may be connected to a network 370. The network 370 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 370 may include wide area networks (WAN), such as the Internet, local area networks (LAN), campus area networks, metropolitan area networks, a direct connection such as through a Universal Serial Bus (USB) port, or any other networks that may allow for data communication. The network 370 may be configured to couple one computing device to another computing device to enable communication of data between the devices. The network 370 may generally be enabled to employ any form of machine-readable media for communicating information from one device to another. The network 370 may include communication methods by which information may travel between computing devices. The network 370 may be divided into sub-networks. The sub-networks may allow access to all of the other components connected thereto or the sub-networks may restrict access between the components. The network 370 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component or object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the operations of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 4:
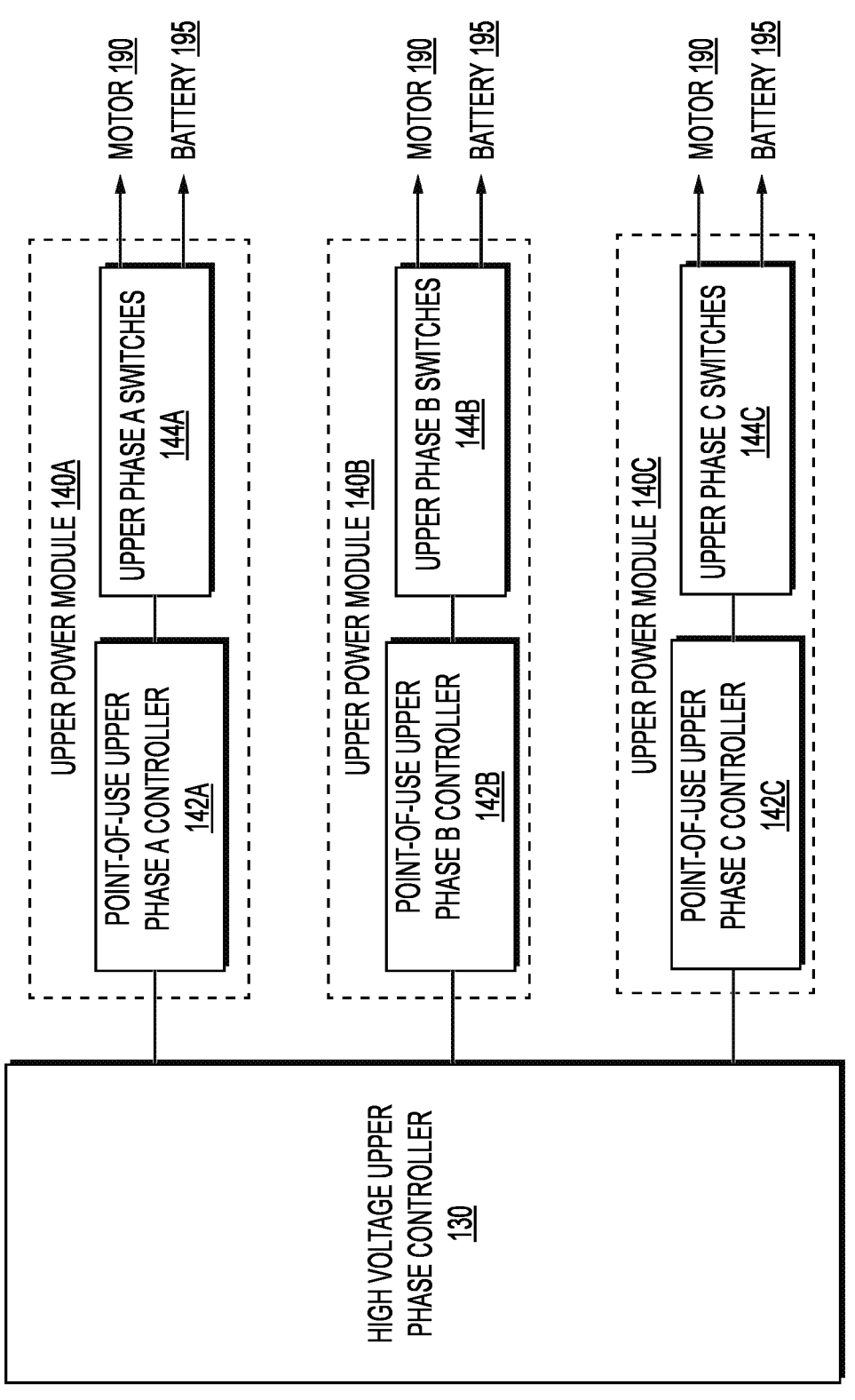
FIG. 4 depicts an exemplary system infrastructure for the point-of-use switch controller of FIG. 2, according to one or more embodiments.

FIG. 4 depicts an exemplary system infrastructure for the point-of-use switch controller of FIG. 2, according to one or more embodiments. For a three-phase inverter, each of the upper phase and the lower phase may include three phases correlating with phases A, B, and C. For example, upper phase power module 140 may include upper phase power module 140A for upper phase A, upper phase power module 140B for upper phase B, and upper phase power module 140C for upper phase C. Upper phase power module 140A may include point-of-use upper phase A controller 142A and upper phase A switches 144A. Upper phase power module 140B may include point-of-use upper phase B controller 142B and upper phase B switches 144B. Upper phase power module 140C may include point-of-use upper phase C controller 142C and upper phase C switches 144C. Each of the upper phase A switches 144A, upper phase B switches 144B, and upper phase C switches 144C may be connected to motor 190 and battery 195. FIG. 4 depicts details of the upper phase power module 140. Although not shown, the lower phase power module 145 may include a similar structure as the upper phase power module 140 for lower phases A, B, and C.

Figure 5:
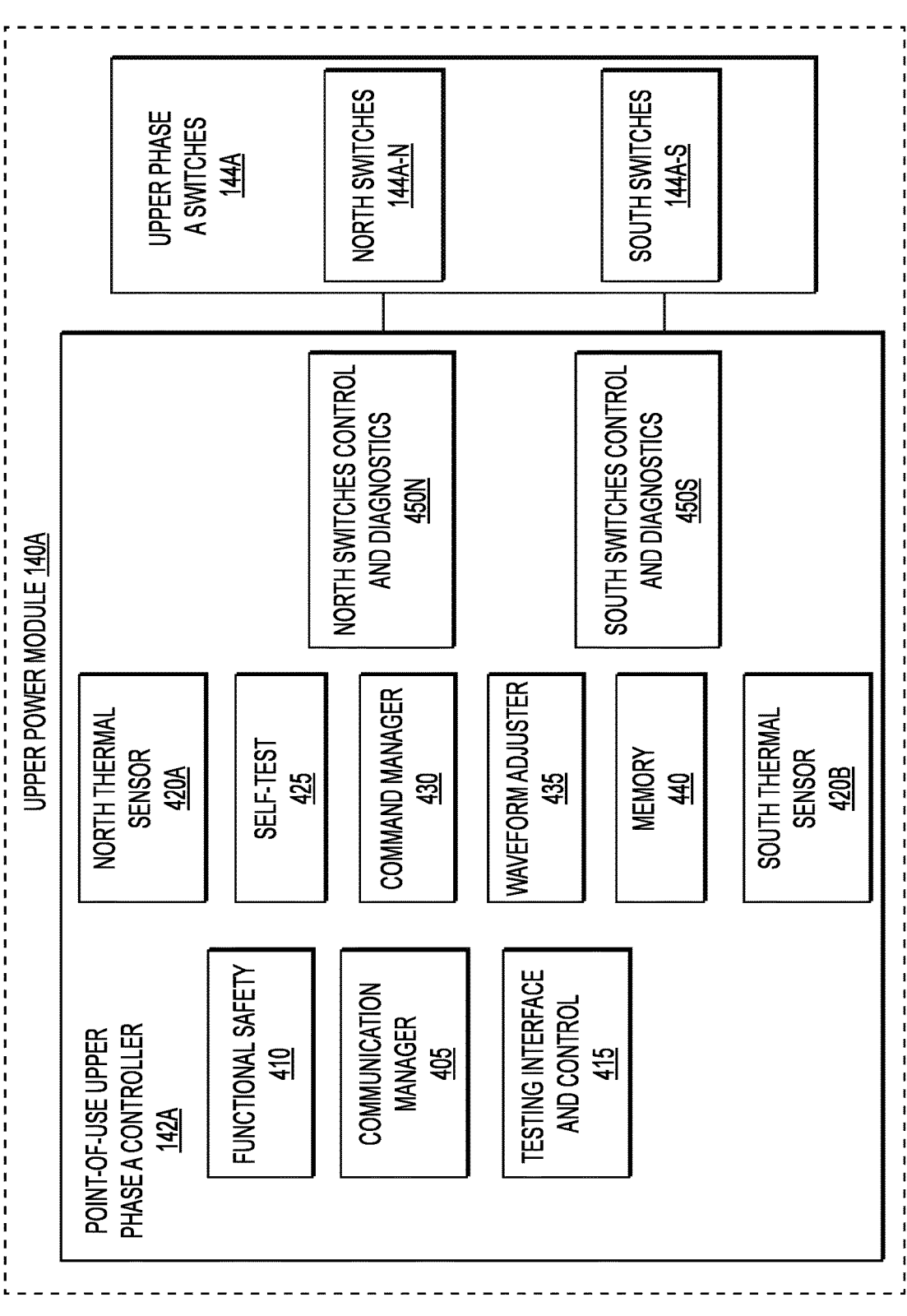
FIG. 5 depicts an exemplary system infrastructure for the upper power module of FIG. 4, according to one or more embodiments.

FIG. 5 depicts an exemplary system infrastructure for the upper power module of FIG. 4, according to one or more embodiments. For example, FIG. 5 provides additional details of upper phase power module 140A. Although not shown, upper phase power module 140B, upper phase power module 140C, and respective lower phase power modules of lower phase power module 145 may include a similar structure as the upper phase power module 140A shown in FIG. 5. Moreover, the terms upper, lower, north, and south used in the disclosure are merely for reference, do not limit the elements to a particular orientation, and are generally interchangeable throughout. For example, the upper phase power module 140 could be referred to a lower phase power module, a north phase power module, a south phase power module, a first phase power module, or a second phase power module.

Upper phase power module 140A may include point-of-use upper phase A controller 142A and upper phase A switches 144A. Upper phase A switches 144A may include one or more groups of switches. As shown in FIG. 5, upper phase A switches 144A may include upper phase A north switches 144A-N and upper phase A south switches 144A-S. Point-of-use upper phase A controller 142A may include one or more memories, controllers, or sensors. For example, point-of-use upper phase A controller 142A may include a communication manager 405, a functional safety controller 410, a testing interface and controller 415, a north thermal sensor 420A, a south thermal sensor 420B, a self-test controller 425, a command manager 430, a waveform adjuster 435, a memory 440, north switches control and diagnostics controller 450N, and south switches control and diagnostics controller 450S. Point-of-use upper phase A controller 142A may include more or less components than those shown in FIG. 5. For example, point-of-use upper phase A controller 142A may include more or less than two switch control and diagnostics controllers, and may include more than two thermal sensors.

Communication manager 405 may control inter-controller communications to and from point-of-use upper phase A controller 142A and/or may control intra-controller communications between components of point-of-use upper phase A controller 142A. Functional safety controller 410 may control safety functions of point-of-use upper phase A controller 142A. Testing interface and controller 415 may control testing functions of point-of-use upper phase A controller 142A, such as end-of-line testing in manufacturing, for example. North thermal sensor 420A may sense a temperature at a first location in point-of-use upper phase A controller 142A, and south thermal sensor 420B may sense a temperature at a second location in point-of-use upper phase A controller 142A. Self-test controller 425 may control a self-test function of point-of-use upper phase A controller 142A, such as during an initialization of the point-of-use upper phase A controller 142A following a power on event of inverter 110, for example. Command manager 430 may control commands received from communication manager 405 issued to the north switches control and diagnostics controller 450N and south switches control and diagnostics controller 450S. Waveform adjuster 435 may control a waveform timing and shape of commands received from communication manager 405 issued to the north switches control and diagnostics controller 450N and south switches control and diagnostics controller 450S. Memory 440 may include one or more volatile and nonvolatile storage media for operation of point-of-use upper phase A controller 142A. North switches control and diagnostics controller 450N may send one or more signals to north switches 144A-N to control an operation of north switches 144A-N, and may receive one or more signals from north switches 144A-N that provide information about north switches 144A-N. South switches control and diagnostics controller 450S may send one or more signals to south switches 144A-S to control an operation of south switches 144A-S, and may receive one or more signals from south switches 144A-S that provide information about south switches 144A-S. As stated above, the terms north and south are merely used for reference, and north switches control and diagnostics controller 450N may send one or more signals to south switches 144A-S, and south switches control and diagnostics controller 450S may send one or more signals to south switches 144A-N.

Figure 6:
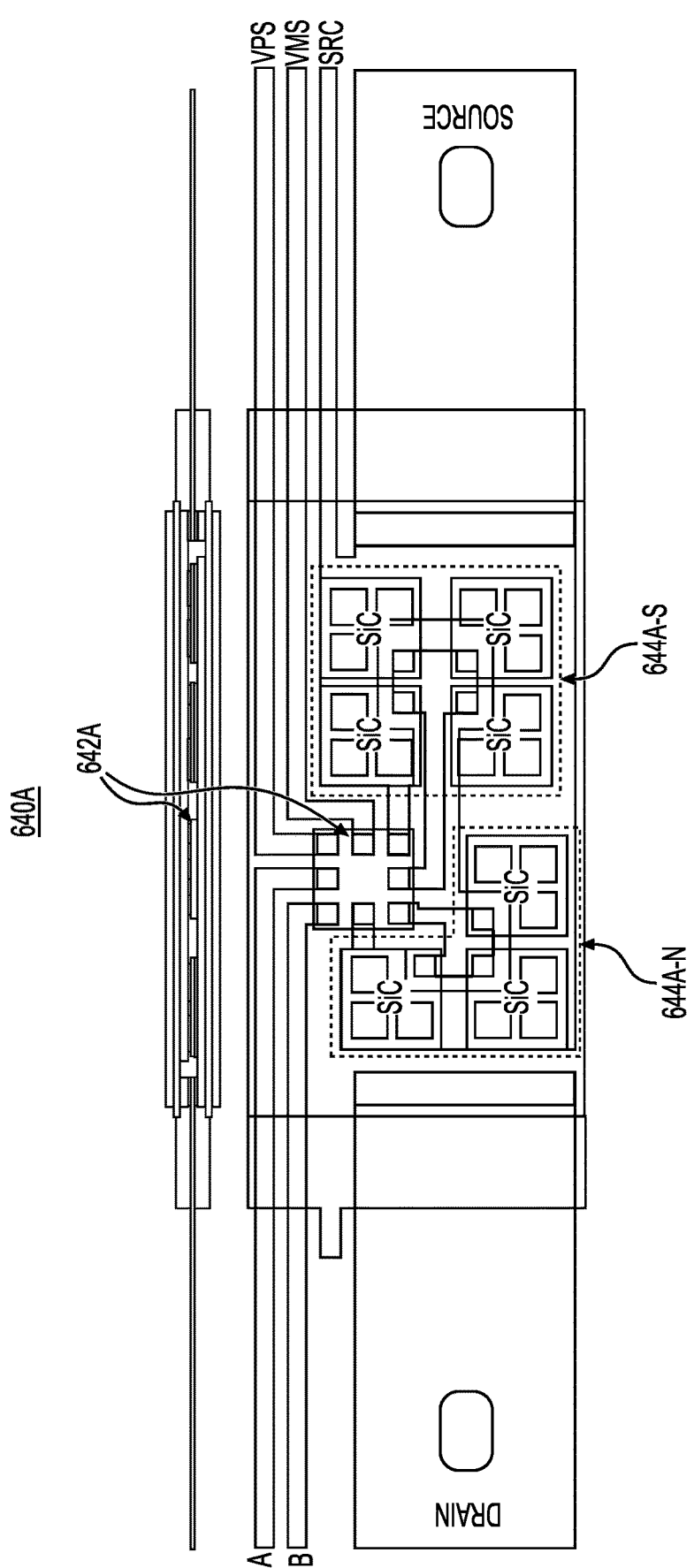
FIG. 6 depicts an exemplary system for a power module for an inverter, according to one or more embodiments.

FIG. 6 depicts an exemplary system for a power module for an inverter, according to one or more embodiments. As shown in FIG. 6, a power module 640A may include a point-of-use controller 642A and phase switches 644A. Point-of-use controller 642A may be an integrated gate driver and an application-specific integrated circuit (ASIC), for example. Phase switches 644A may include one or more groups of switches, such as north phase switches 644A-N and south phase switches 644A-S. Each die of north phase switches 644A-N may include a gate and a plurality of SiC FETs, for example. As shown in FIG. 6, south phase switches 644A-S includes four dies, with each of the four dies including three SiC FETs. However, the disclosure is not limited thereto, and a number of groups of phase switches, dies, and SiC FETS, for example, may vary according to an application of the power module.

Power module 640A may be an implementation of upper phase power module 140 upper phase power module 140A, for example, which may be an implementation of upper phase power module 140 or lower phase power module 145, for example. Point-of-use controller 642A may be an implementation of point-of-use upper phase A controller 142A, which may be an implementation of point-of-use upper phase controller 142 or upper phase switches point-of-use lower phase controller 146, for example. Phase switches 644A be an implementation of upper phase A switches 144A, which may be an implementation of upper phase switches 144 or lower phase switches 148, for example. North phase switches 644A-N and south phase switches 644A-S may be an implementation of upper phase A north switches 144A-N and upper phase A south switches 144A-S.

Figure 7:
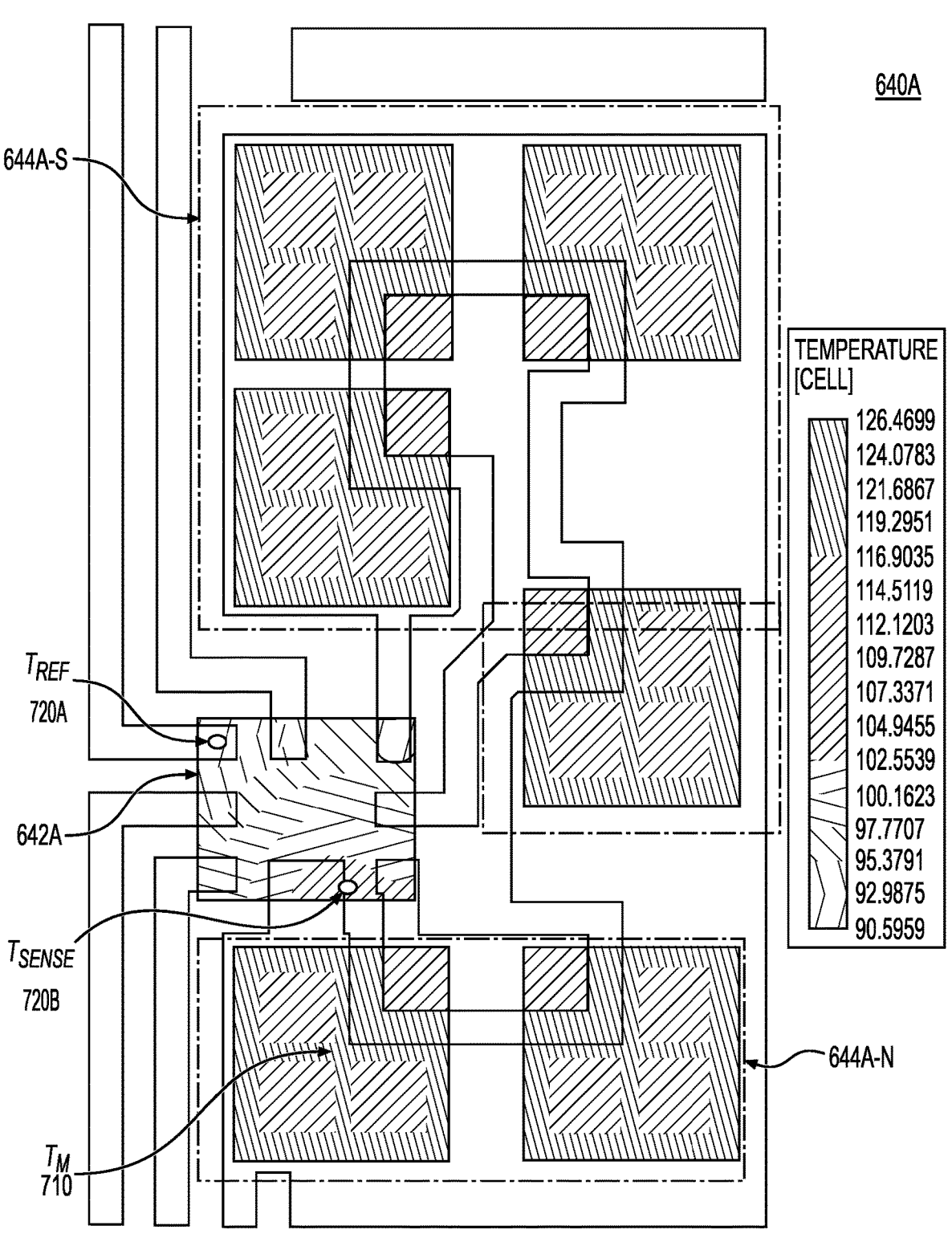
FIG. 7 depicts an exemplary system for sensing a temperature of a power module for an inverter, according to one or more embodiments.

Point-of-use controller 642A may include one or more memories, controllers, or sensors. For example, as shown in FIG. 7, point-of-use controller 642A may include a north thermal sensor 720A and a south thermal sensor 720B. Point-of-use controller 642A may include more than two thermal sensors. North thermal sensor 720A may sense a temperature at a first location in point-of-use controller 642A, and south thermal sensor 720B may sense a temperature at a second location in point-of-use controller 642A. Point-of-use controller 642A may send one or more signals to north phase switches 644A-N to control an operation of north phase switches 644A-N, and may receive one or more signals from north phase switches 644A-N that provide information about north phase switches 644A-N. Point-of-use controller 642A may send one or more signals to south phase switches 644A-S to control an operation of south phase switches 644A-S, and may receive one or more signals from south phase switches 644A-S that provide information about south phase switches 644A-S. As stated above, the terms north and south are merely used for reference. Point-of-use controller 642A may receive power and send and receive signals over signal channels A, B, VPS, VMS, and SRC, for example. Point-of-use controller 642A may control north phase switches 644A-N and south phase switches 644A-S to control a current passing between the drain and source of power module 640A. During an operation of the north phase switches 644A-N and south phase switches 644A-S, point-of-use controller 642A may monitor the temperature of the power module 640A to adjust an operation of power module 640A or to assert a fault, for example. Point-of-use controller 642A may monitor the temperature of the power module 640A using north thermal sensor 720A and a south thermal sensor 7208.

FIG. 7 depicts an exemplary system for sensing a temperature of a power module for an inverter, according to one or more embodiments. As shown in FIG. 7, point-of-use controller 642A may precisely measure a temperature using on-chip integrated trimmed thermal sensors including north thermal sensor 720A and south thermal sensor 720B. North thermal sensor 720A and south thermal sensor 720B may measure the absolute point-of-use controller 642A temperature to within tolerances of +/− approximately 1.5° C. North thermal sensor 720A and south thermal sensor 720B on point-of-use controller 642A may be arranged in such a manner to measure temperature gradients across point-of-use controller 642A. One or more embodiments may use the absolute measured temperature of point-of-use controller 642A in conjunction with the temperature gradients across point-of-use controller 642A to accurately predict a die temperature 710 (TM) of one or more adjacent dies of north phase switches 644A-N and south phase switches 644A-S within +/− approximately 5° C. Although FIG. 7 illustrates die temperature 710 located on a die of north phase switches 644A-N, die temperature 710 may include one or more temperature estimations of any of the dies of north phase switches 644A-N and south phase switches 644A-S. One or more embodiments may use a rate of change of the temperature difference between north thermal sensor 720A and south thermal sensor 720B to improve the response time of die temperature 710. The temperature gradient across the die is extrapolated to predict the temperature of an adjacent SiC die. Using the temperature gradient alone, the predicted temperature will lag the actual temperature during a fast transient event. Using the rate of change of the temperature gradient may improve the transient response significantly during a fast transient event. The rate of change of the temperature gradient of the temperature difference between north thermal sensor 720A and south thermal sensor 720B may be indicative of a magnitude of an applied power pulse.

Relative to thermistor-based systems, one or more embodiments may provide a much tighter temperature measurement of die temperature 710, such as within +/− approximately 5° C., for example. Relative to thermistor-based systems, one or more embodiments may require a reduced margin of operation due to tighter tolerances of measured temperature, which may reduce the cost and/or complexity of the system. Relative to thermistor-based systems, one or more embodiments may allow power module 640A to operate at higher average temperatures.

Relative to thermistor-based systems, one or more embodiments may provide a smaller overall SiC die area and/or lower cost heat sinks. The more accurately a temperature is measured, the less margin is required to endure operation within a given temperature operating range. For example, if a temperature is measured to within +/−15° C., and the SiC die should not exceed 175° C., then the system must be designed so that a nominal system does not exceed 160° C. (175° C.-15° C.). Because of potential thermal sensor error, a nominal system may erroneously measure temperature at 175° C. and be shut down. This erroneous measurement may lead to an actual loss of 15° C. of increased power that could be dissipated in the switch. Thus, if the temperature is more accurately measured to +/−5° C., then only a 5° C. margin is needed. Consequently, the number of SiC dies per power switch may be reduced for a given load requirement, because the conduction losses can be higher (fewer SiC dies) due to a maximum temperature of 170° C. (175° C.-5° C.) on a nominal device instead of 160° C. (175° C.-15° C.). With respect to heat sink cost, if the same number of SiC dies is used, then a thermal system may allow the nominal die to get 10° C. (15° C.-5° C.) hotter. One or more embodiments may allow modified gate drive profiles based upon die temperature 710, which may reduce switching loss and extend battery range. One or more embodiments may allow for temperature-based control of power module 640A during a bulk capacitance discharge.

One or more embodiments may provide a Vbe error in a thermal sensor (north thermal sensor 720A or south thermal sensor 720B) of +/− approximately 1.6° C. One or more embodiments may provide a buffer error from a thermal sensor of +/− approximately 0.225° C. One or more embodiments may provide a GND error of +/− approximately 0.0625° C. One or more embodiments may provide a VDDL error in a thermal sensor of approximately 0.356° C. from −40° C. to 165° C. One or more embodiments may provide a VDDL transient error of +/− approximately 1.25° C. One or more embodiments may provide an ADC integral non-linearity error of approximately 0.125° C. from −40° C. to 165° C. One or more embodiments may provide an ADC effective number of bits with twelve bits of accuracy, where 400 uV equals +/− approximately 0.1° C. One or more embodiments may provide a trim and test error of +/− approximately 1.5° C. One or more embodiments may provide an error without chuck and VDDL transient error and including half of thermal sensor and integral nonlinearity error (spread as a function of temperature transient) of +/− approximately 2.128° C. One or more embodiments may provide an error with chuck measurement error in addition to the above error of +/− approximately 3.628° C.

Accurately understanding die temperature 710 within power module 640A may allow power module 640A to be optimized for reliability and efficiency. One or more embodiments may provide power module 640A incorporating north phase switches 644A-N and south phase switches 644A-S along with point-of-use controller 642A. Multiple thermal sense points on the point-of-use controller 642A may be used to sense the absolute temperature of the point-of-use controller 642A along with the thermal gradient between north thermal sensor 720A and south thermal sensor 720B. North thermal sensor 720A and south thermal sensor 720B may be arranged on the ASIC in an advantageous manner such that the absolute temperature and thermal gradient measurements may be used to estimate the temperature of north phase switches 644A-N and south phase switches 644A-S. The rate of change of the thermal gradient with respect to time may also be used to improve the response time of the estimate.

Precise temperature sensing of north phase switches 644A-N and south phase switches 644A-S may allow the overall system to be optimized for cost and efficiency. Some systems may use a thermistor placed within the power module. The thermistor allows the temperature to be measured in the physical location of the thermistor, which in application may be as much as 20° C. cooler than an adjacent SiC die. In addition, there may be significant coupling that occurs between the high current and high voltage lines, and the thermistor requires heavy filtering of the monitoring signal, which may greatly reduce response time.

One or more embodiments may provide an apparatus and method to precisely estimate the temperature of north phase switches 644A-N and south phase switches 644A-S within point-of-use controller 642A. One or more embodiments may provide point-of-use controller 642A that is integrated into power module 640A along with north phase switches 644A-N and south phase switches 644A-S.

With point-of-use controller 642A, multiple thermal sensors, such as north thermal sensor 720A and south thermal sensor 720B may be located across point-of-use controller 642A. The temperature of these on-chip trimmed thermal sensors may be precisely measured. In addition, north thermal sensor 720A and south thermal sensor 720B may be arranged across point-of-use controller 642A in such a manner to measure the temperature gradients across point-of-use controller 642A. One or more embodiments may use the absolute measured temperature of point-of-use controller 642A die in conjunction with the temperature gradients across point-of-use controller 642A to accurately predict the SiC die temperature within +/− approximately 5° C. Additionally, the rate of change of the temperature difference between north thermal sensor 720A and south thermal sensor 720B may be used to improve the response time of the die temperature 710.

One or more embodiments may provide point-of-use controller 642A located inside power module 640A. Point-of-use controller 642A may be an ASIC. Point-of-use controller 642A may include north thermal sensor 720A (TREF) and south thermal sensor 720B (TSENSE) on the point-of-use controller 642A. North thermal sensor 720A and south thermal sensor 720B may be constructed of a stack of diodes having a voltage drop with a negative temperature coefficient. However, the disclosure is not limited thereto, and may include other ways to construct thermal sensors within point-of-use controller 642A.

The temperatures of north thermal sensor 720A and south thermal sensor 720B may be precisely measured at a known sampling rate, such as 100 μs, for example. The absolute temperatures of the sensors may be monitored, as well as the difference between the thermal sensor temperatures. The equations 1-5 below may be used to predict die temperature 710.

$$\Delta T_N = T_{SENSE_N} - T_{REF_N} \qquad \text{Equation 1:}$$

$$\beta_N = (\Delta T_N - \Delta T_{N-1})^* f_s \qquad \text{Equation 2:}$$

$$S(\beta_N) = \alpha \text{ for } 0 < |\beta_N| < A \qquad \text{Equation 3:}$$

$$S(\beta_N) = \gamma \text{ for } |\beta_N| >= A \qquad \text{Equation 4:}$$

$$T_{M_N} = (\Delta T_N - B)^* C + \beta_N^* S(\beta_N) + T_{SENSE_N} \qquad \text{Equation 5:}$$

In the equations 1-5 above, $\Delta T_N$ may be a temperature gradient across the point-of-use controller 642A at a given sample time N, $T_{REF_N}$ may be a temperature recorded by north thermal sensor 720A at time N, $T_{SENSE_N}$ may be a temperature recorded by south thermal sensor 720B at time N, $\beta_N$ may be a slope of the gradient from one temperature sample to the next with respect to time, $f_s$ may represent a sampling rate, $\alpha$, $\gamma$, A, B, and C may be constants based on layout geometry and temperature, and $T_{M_N}$ may be a die temperature 710. B may be an offset related to power being dissipated in the point-of-use controller 642A itself, and may be equal to approximately 2, for example. C may be a slope without gradient slope prediction, and may be equal to approximately 2.27, for example. A may be a breakpoint point for a piecewise linear fit for the gradient slope compensation. If the gradient slope is less than A, then $\alpha$ may be equal to approximately 0.444, for example. If the gradient slope is greater than A, then $\gamma$ may be equal to approximately 0.0942, for example. For example, point-of-use controller 642A may be tested in an end-of-line test. North thermal sensor 720A and south thermal sensor 720B may be calibrated, and constants may be customized for the particular point-of-use controller 642A based on differing characteristics of each manufactured point-of-use controller 642A. The constants may be stored in a memory of point-of-use controller 642A, for example.

Figure 8:
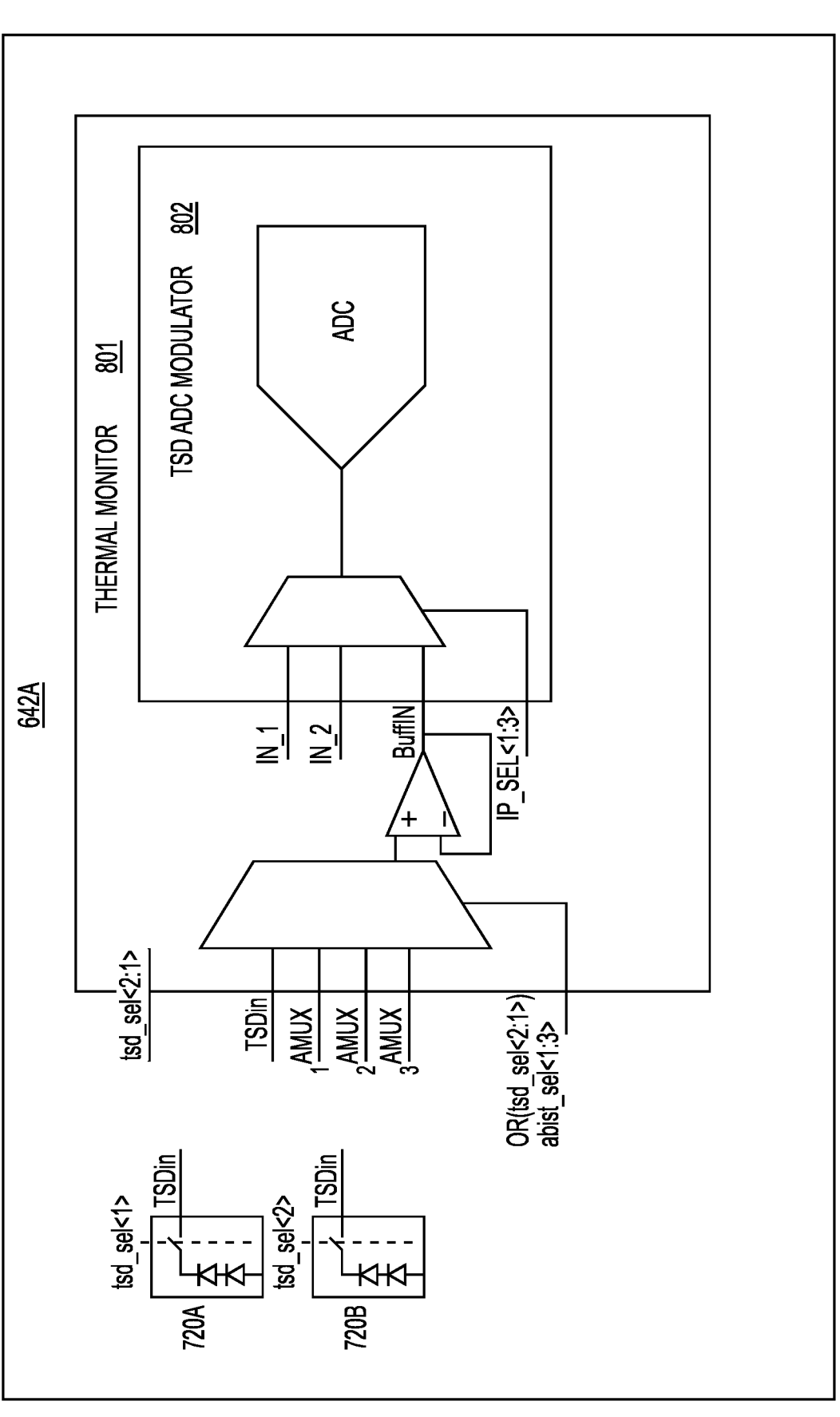
FIG. 8 depicts an exemplary electrical schematic for sensing a temperature of a power module for an inverter, according to one or more embodiments.

FIG. 8 depicts an exemplary electrical schematic for sensing a temperature of a power module for an inverter, according to one or more embodiments. As shown in FIG. 8, point-of-use controller 642A may include north thermal sensor 720A and south thermal sensor 720B, which may include diode stacks, and thermal monitor 801 including analog to digital converter (ADC) 802. As shown in FIG. 8, point-of-use controller 642A may include a multiplexer to receive signals TSDin from north thermal sensor 720A and south thermal sensor 720B. For example, when ABIST_SEL<1:3> equals zero and OR (TSD_SEL<2:1>) equals one, the multiplexer may select TSDin. Point-of-use controller 642A may include additional circuitry as shown in FIG. 8, or other circuitry as needed for an application. However, the disclosure is not limited thereto. Point-of-use controller 642A may provide a system to precisely estimate, such as using the constants stored in a memory of point-of-use controller 642A and the equations discussed above, die temperature 710 located within point-of-use controller 642A. Point-of-use controller 642A may provide a system to operate north phase switches 644A-N and south phase switches 644A-S at higher temperatures, due to the ability to have a much tighter standard deviation than other systems, such as those using a thermistor, for example. One or more embodiments may provide a system with improved accuracy, which may allow the system design to be optimized due to the reduced margin of error.

Figure 9:
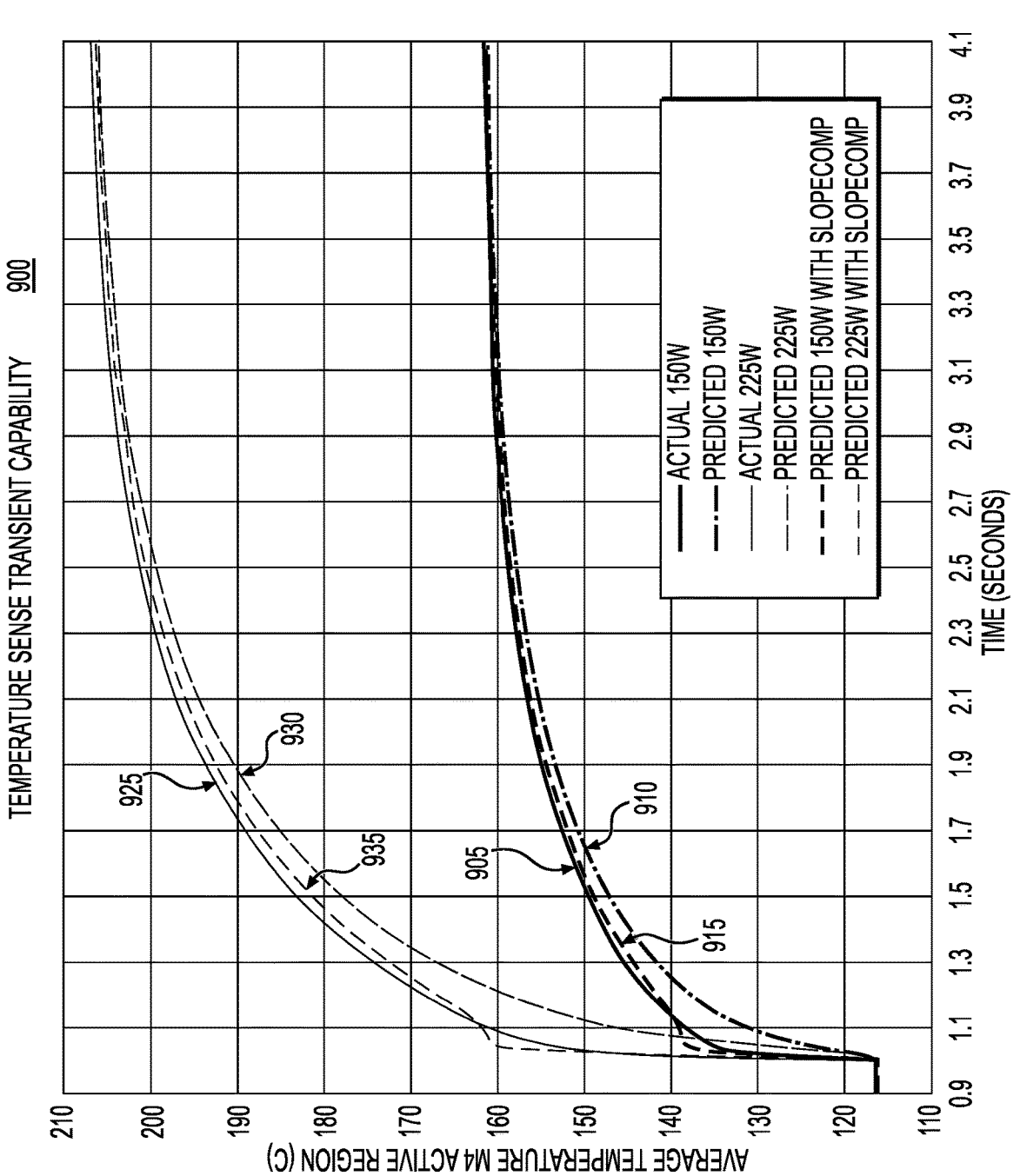
FIG. 9 depicts a thermal simulation of an exemplary system for sensing a temperature of a power module for an inverter, according to one or more embodiments.

FIG. 9 depicts a thermal simulation of an exemplary system for sensing a temperature of a power module for an inverter, according to one or more embodiments. FIG. 9 depicts a thermal simulation 900 of a 150 W response and a 225 W response from power module 640A, with a step response beginning at 1.0 s. As shown in FIG. 9, at 150 W, a predicted temperature 910 (e.g. die temperature 710) may follow an actual measured temperature 905 with small error. The system may provide an even better predicted temperature 915, although with a small overshoot, using a slope compensation model (such as $\beta_N$, for example). As shown in FIG. 9, at 225 W, a predicted temperature 930 (e.g. die temperature 710) may follow an actual measured temperature 925 with small error. The system may provide an even better predicted temperature 935, although with a small overshoot, using a slope compensation model (such as $\beta_N$, for example).

Figure 10:
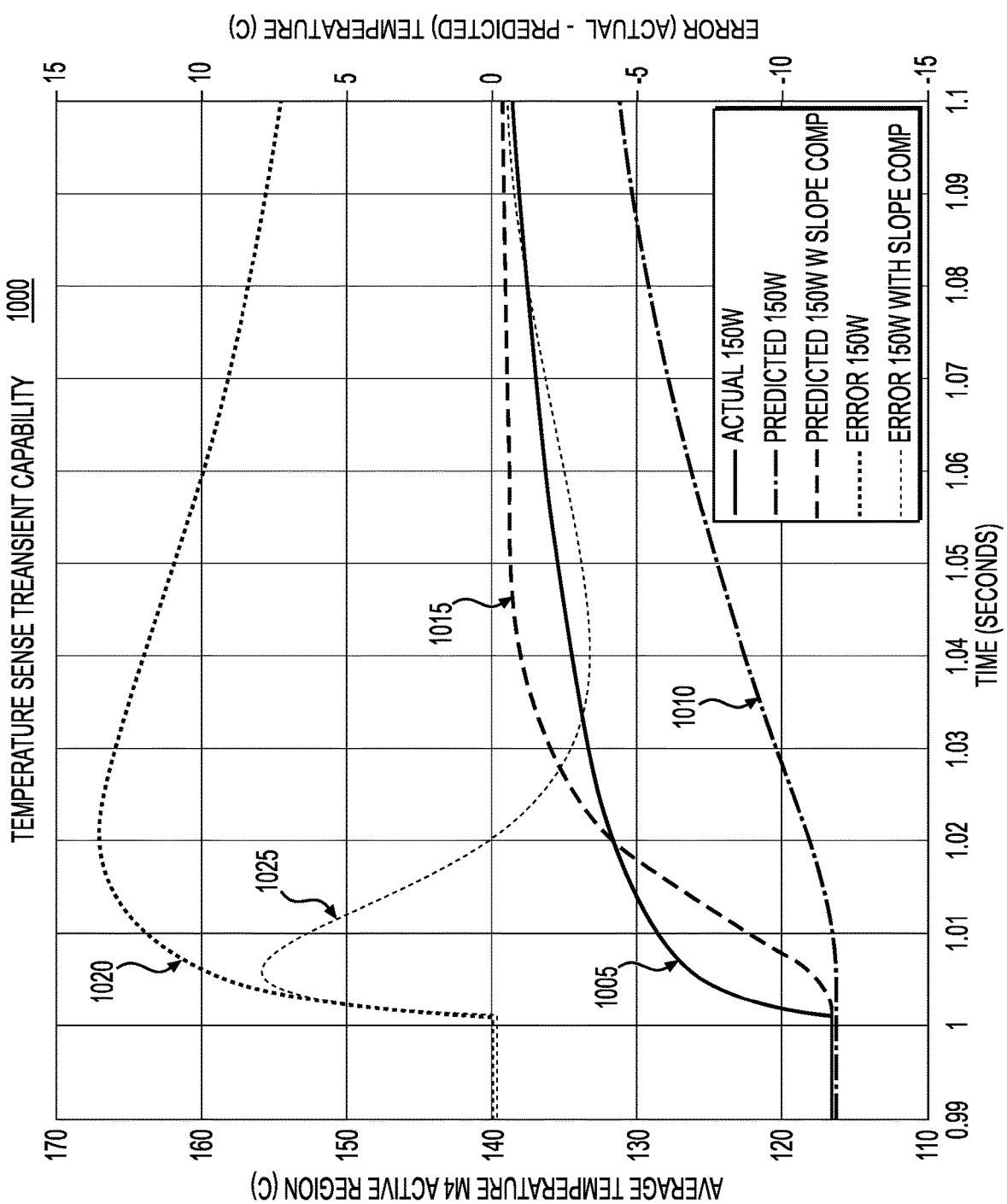
FIG. 10 depicts a temperature sense transient capability of an exemplary system for sensing a temperature of a power module for an inverter, according to one or more embodiments.

FIG. 10 depicts a temperature sense transient capability of an exemplary system for sensing a temperature of a power module for an inverter, according to one or more embodiments. FIG. 10 depicts a simulation 1000 of a 150 W response from power module 640A, with a step response beginning at 1.0 s. As shown in FIG. 10, a predicted temperature 1010 (e.g. die temperature 710) may follow an actual measured temperature 1005 with small error 1020. The system may provide an even better predicted temperature 1015, although with a small overshoot, using a slope compensation model (such as $\beta_N$, for example). Using the slope compensation model, error 1025 may rapidly approach zero.

One or more embodiments may allow for temperature dependent gate drive profiles of the phase switch to reduce switching losses and extend battery range. One or more embodiments may include a point-of-use controller, such as an integrated gate driver ASIC, for example. The ASIC may precisely measure a temperature using on-chip integrated trimmed thermal sensors. The on-chip thermal sensors may measure the absolute ASIC temperature to within tolerances of +/− approximately 1.5° C. The thermal sensors on the ASIC may be arranged in such a manner to measure temperature gradients across the ASIC. One or more embodiments may use the absolute measured ASIC temperature in conjunction with the temperature gradients across the ASIC to accurately predict the SiC die temperature within +/− approximately 5° C. One or more embodiments may use a rate of change of the temperature difference between ASIC thermal sensors to improve the response time of the predicted SiC die temperature. Relative to thermistor-based systems, one or more embodiments may provide a much tighter temperature measurement of the SiC die, such as within +/− approximately 5° C., for example. Relative to thermistor-based systems, one or more embodiments may require a reduced margin of operation due to tighter tolerances of measured temperature, which may reduce the cost and/or complexity of the system. Relative to thermistor-based systems, one or more embodiments may allow power modules to operate at higher average temperatures. Relative to thermistor-based systems, one or more embodiments may provide a smaller overall SiC die area and/or lower cost heat sinks. One or more embodiments may allow modified gate drive profiles based upon SiC temperature, which may reduce switching loss and extend battery range. One or more embodiments may allow for temperature-based control of the power module during a bulk capacitance discharge. With an integrated ASIC gate driver IC, multiple thermal sensors may be located across the ASIC. The temperature of these on-chip trimmed thermal sensors may be precisely measured. In addition, these thermal sensors may be arranged across the ASIC in such a manner to measure the temperature gradients across the die. One or more embodiments may use the absolute measured ASIC die temperature in conjunction with the temperature gradients across the ASIC to accurately predict the SiC die temperature within +/− approximately 5° C. Additionally, the rate of change of the temperature difference between ASIC die sensors may be used to improve the response time of the predicted SiC die temperature. One or more embodiments may provide a system to operate an average SiC die at higher temperature, due to the ability to have a much tighter standard deviation than other systems, such as those using a thermistor, for example. One or more embodiments may provide a system with improved accuracy, which may allow the system design to be optimized due to the reduced margin of error.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system comprising:
   an inverter configured to convert DC power from a battery to AC power to drive a motor, wherein the inverter includes:

a power module including a drain terminal and a source terminal;

one or more phase switches configured to control a current flow between the drain terminal and the source terminal; and a point-of-use controller including two or more thermal sensors on the point-of-use controller, the point-of-use controller configured to determine a temperature of the one or more phase switches using the two or more thermal sensors, wherein the point-of-use controller is configured to determine the temperature of the one or more phase switches using a temperature gradient of the point-of-use controller using the two or more thermal sensors.

2. The system of claim 1, wherein the point-of-use controller is an application-specific integrated circuit.

3. The system of claim 1, wherein the point-of-use controller is a gate driver for the one or more phase switches.

4. The system of claim 1, wherein the one or more phase switches include one or more silicon carbide dies.

5. The system of claim 1, wherein each of the two or more thermal sensors includes a stack of diodes having a voltage drop with a negative temperature coefficient.

6. The system of claim 1, wherein the point-of-use controller is configured to determine the temperature of the one or more phase switches using respective absolute temperatures of the two or more thermal sensors and a difference between the respective absolute temperatures of the two or more thermal sensors.

7. The system of claim 1, further comprising:

the battery configured to supply the DC power to the inverter; and the motor configured to receive the AC power from the inverter to drive the motor.

8. A system comprising:

a power module for an inverter configured to convert DC power to AC power, the power module including a drain terminal and a source terminal;

one or more phase switches configured to control a current flow between the drain terminal and the source terminal; and a point-of-use controller including two or more thermal sensors on the point-of-use controller, the point-of-use controller configured to determine a temperature of the one or more phase switches using the two or more thermal sensors, wherein the point-of-use controller is configured to determine the temperature of the one or more phase switches using respective absolute temperatures of the two or more thermal sensors and a difference between the respective absolute temperatures of the two or more thermal sensors.

9. The system of claim 8, wherein the point-of-use controller is an application-specific integrated circuit gate driver for the one or more phase switches.

10. The system of claim 8, wherein the one or more phase switches include one or more silicon carbide dies.

11. The system of claim 8, wherein each of the two or more thermal sensors includes a stack of diodes having a voltage drop with a negative temperature coefficient.

12. The system of claim 8, wherein the point-of-use controller is configured to determine the temperature of the one or more phase switches using a temperature gradient of the point-of-use controller using the two or more thermal sensors.

13. A system including one or more controllers comprising:

a first thermal sensor at a first location on the one or more controllers; and a second thermal sensor at a second location on the one or more controllers, wherein the one or more controllers are configured to determine a temperature of a component outside the one or more controllers using the first thermal sensor and the second thermal sensor by:

determining a first temperature difference between the first thermal sensor and the second thermal sensor at a first time, determining a second temperature difference between the first thermal sensor and the second thermal sensor at a second time, and determining the temperature of the component based on the first temperature difference and the second temperature difference.

14. The system of claim 13, wherein the one or more controllers are further configured to:

determine the temperature of the component based on the first temperature difference, the second temperature difference, and a slope of a gradient between the first temperature difference and the second temperature difference.

15. The system of claim 13, wherein the one or more controllers are further configured to:

determine the temperature of the component based on the first temperature difference, the second temperature difference, a slope of a gradient between the first temperature difference and the second temperature difference, and a layout geometry of the component.

16. The system of claim 13, wherein the one or more controllers are further configured to:

determine the temperature of the component based on the first temperature difference, the second temperature difference, and a rate of change between the first temperature difference and the second temperature difference.

17. The system of claim 13, wherein the one or more controllers are further configured to:

determine the temperature of the component based on a temperature of the first thermal sensor, the first temperature difference, and the second temperature difference.

* * * * *